(12) United States Patent
Allspaw et al.

(10) Patent No.: US 12,001,652 B2
(45) Date of Patent: *Jun. 4, 2024

(54) SYSTEM AND METHOD FOR ANALYSIS AND VISUALIZATION OF INCIDENT DATA

(71) Applicant: ADAPTIVE CAPACITY LABS, LLC, Brooklyn, NY (US)

(72) Inventors: John Allspaw, Brooklyn, NY (US); Richard Cook, Chicago, IL (US); Christopher Fairbanks, Barkhamsted, CT (US)

(73) Assignee: Adaptive Capacity Labs, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,045

(22) Filed: Feb. 24, 2023

(65) Prior Publication Data
US 2023/0221835 A1    Jul. 13, 2023

Related U.S. Application Data

(63) Continuation of application No. 17/705,779, filed on Mar. 28, 2022, now Pat. No. 11,614,850, which is a continuation-in-part of application No. 17/212,837, filed on Mar. 25, 2021, now Pat. No. 11,314,387, and a continuation of application No. 17/076,724, filed on Oct. 21, 2020, now Pat. No. 10,990,247.

(51) Int. Cl.
    *G06F 3/0482*    (2013.01)
    *G06F 3/04817*   (2022.01)
    *G06T 11/00*     (2006.01)

(52) U.S. Cl.
    CPC ........ *G06F 3/0482* (2013.01); *G06F 3/04817* (2013.01); *G06T 11/00* (2013.01); *G06T 2200/24* (2013.01)

(58) Field of Classification Search
    None
    See application file for complete search history.

*Primary Examiner* — Toan H Vu
(74) *Attorney, Agent, or Firm* — Stoyanov Law PLLC; Roy L. Chan

(57) ABSTRACT

A system for analyzing a plurality of grouped incidents belonging to a group, the system having a database storing the plurality of grouped incidents and a GUI configured to receive from the database the plurality of group incidents and to display the plurality of group incidents. The GUI has a group interface that is configured to display one of a grouped incidents panel, a group visualization panel, or combinations thereof. The group has the plurality of grouped incidents, a plurality of grouped sources, and a group incident tag.

9 Claims, 31 Drawing Sheets

SYSTEM AND METHOD FOR ANALYSIS AND VISUALIZATION OF INCIDENT DATA

CROSS-REFERENCE TO RELATED APPLICATIONS

The present application is a continuation of U.S. patent application Ser. No. 17/705,779, filed Mar. 28, 2022, and entitled "System and Method for Analysis and Visualization of Incident Data," which is a continuation-in-part of U.S. patent application Ser. No. 17/212,837, filed Mar. 25, 2021, now U.S. Pat. No. 11,314,387 B1, and entitled "System and Method for Analysis and Visualization of Incident Data," which is a continuation of U.S. patent application Ser. No. 17/076,724, filed Oct. 21, 2020, now U.S. Pat. No. 10,990,247 B1, and entitled "System and Method for analysis and visualization of incident data," the disclosures of which are incorporated herein by reference in their entirety. The present application is related to U.S. Design application Ser. No. 29/755,633, now U.S. Design Pat. Nos. 940,158 S, and 29/755,635, now U.S. Des. Pat. No. 940,159 S, both filed Oct. 21, 2020, the disclosures of which are incorporated herein by reference in their entirety.

STATEMENT REGARDING FEDERALLY SPONSORED RESEARCH OR DEVELOPMENT

[Not Applicable]

REFERENCE TO SEQUENCE LISTING, A TABLE, OR A COMPUTER PROGRAM LISTING COMPACT DISC APPENDIX

[Not Applicable]

BACKGROUND OF THE INVENTION

The present invention is related to methods and systems for analyzing and visualizing data collected during an incident. An incident as used in the description may be any event, accident, or occurrence of any duration, for example, airplane or other vehicle accident, network security breach, denial of service attack, power outages, professional conventional sports or e-sports competitions. Investigators may collect various data related to an incident to analyze the incident. Data may be available from one or multiple sources, and may include communications between incident participants or observers, video or audio recordings, images, sensor data, alerts, notifications, alarms data and others.

The various embodiments of the invention greatly facilitate the processing and analysis of data associated with the incident, by aiding the investigation of an incident and providing information for an incident investigator to use, for example, in interviewing, collecting additional information, facilitating group debriefing or post incident discussions.

BRIEF SUMMARY OF THE INVENTION

An embodiment of the present invention is an apparatus for analyzing a plurality of grouped incidents belonging to a group, the apparatus comprising the group and a group interface. The group comprises the plurality of grouped incidents, a plurality of grouped sources, and a grouped incident tag. The group interface comprises a grouped incidents panel and a group visualization panel. Each of the plurality of grouped sources comprises a source information. The source information is selected from the group consisting of a source name, a source incident information, a source description, a source tenure, and combinations thereof. The source incident information is one or more of a source incident count and a source incidents list. Each of the plurality of grouped incidents comprises an incident information and an incident event. The incident event is associated with an incident event source. The incident event source is selected from the plurality of group sources. The grouped incidents panel displays an incident list comprising one or more incident source-event graphics associated with each of the plurality of grouped incidents. The incident source-event graphic comprises a source-event icon associated with the incident event source. The source-event icon has an icon characteristic visually representative of the source tenure of the incident event source. The size of the source-event icon is proportional to a number or quantity of the incident events associated with the incident event source. The grouped incidents panel comprises one or more incident user controls associated with each of the plurality of grouped incidents. The incident user control is configured to enable a user to annotate each of the plurality of grouped incidents and to view the incident information. The group visualization panel comprises an incident visualization panel. The incident visualization panel comprises an incidents area displaying an incident graphic visually representative of the incident information of each of the plurality of grouped incidents during an incident display period, an incident display period user control allowing the user to change the incident display period, an incident tag user control enabling the user to select the group incident tag to be a visible incident tag or to be a hidden incident tag, and a group timeline panel comprising a timeline sequence graphic representing a sequence of each of the plurality of grouped incidents and a display period graphic highlighting a portion of the timeline sequence graphic corresponding to the incident display period.

In another embodiment of the present invention, the group interface further comprises a group sources panel and a group tag panel. The group sources panel displays a group source list comprising the source information associated with each of the plurality of grouped sources. The group sources panel comprises a source user control configured to enable the user to modify the source information. The group tag panel displays a group tag list comprising tag information for the group incident tag. The group tag panel comprises a tag user control configured to enable the user to add the group incident tag and to modify tag information. The incident list comprises the incident information of each of the plurality of grouped incidents. The incident information is selected from the group consisting of an incident name, an incident description, incident time data, cross-incident connections data, incident notes, associated incident tags, and combinations thereof. The incident user control is configured to enable the user to utilize the incident user control to modify the incident name, to create a new group incident tag, to associate the new incident tag with the grouped incident, to create incident notes, and combinations thereof. The grouped incident tag comprises a tag characteristic. The tag characteristic is selected from color, shading, pattern, line weight, line type, and combinations thereof. The grouped incident tag is associated with the group incident. The incident graphic is visually representative of the tag characteristic.

In yet another embodiment of the present invention, the group visualization panel further comprises a sources visualization panel. The sources visualization panel comprises one or more group source graphics associated with each of the plurality of group sources. The one or more group source graphics comprise a source graphic visual characteristic representative of the source tenure of each of the plurality of group sources. The one or more group source graphics comprise a source graphic size proportional to the source incident count of each of the plurality of group sources.

In another embodiment of the present invention, the grouped incident tag is a viewable incident tag. The incident graphic comprises an incident visual characteristic indicative of a viewable incident tag associated with the incident. The incident visual characteristic is selected from color, shading, pattern, line weight, line type, and combinations thereof. The incident visualization panel is viewable in one of an incident comparison view and an incident connection view. The group interface further comprises a navigation user control configured to enable the user to switch between the grouped incidents panel, the group visualization panel, and the incident visualization panel. The navigation user control is configured to enable the user to view the incident visualization panel in one of the incident comparison view and the incident connection view. The incidents area comprises a chronological sequence of the incident graphic for each grouped incident in the display period. In the incident comparison view the incident graphic has an incident graphic size proportionally representative of an incident quantitative characteristic. In the incident connection view, the incidents area comprises an incident connection graphic, visually indicating a cross-incident connection between the grouped incidents.

In yet another embodiment of the present invention, the cross-incident connection is selected from a first type of cross-incident connection and a second type of cross-incident connection. The incident connection graphic is selected from a first incident connection graphic and a second incident connection graphic. The first incident connection graphic visually indicates the first type of cross-incident connection, and the second incident connection graphic visually indicates the second type of cross-incident connection. The first incident connection graphic and the second incident connection graphic are visually differentiated.

In another embodiment of the present invention, the first incident connection graphic and the second incident connection graphic are visually differentiated by displaying the first graphic above the chronological sequence and displaying the second graphic below the chronological sequence in the incidents area.

In yet another embodiment of the present invention, the group interface further comprises a group sources panel and a group tag panel. The group sources panel displays a group source list comprising the source information associated with each of the plurality of grouped sources. The group sources panel comprises a source user control configured to enable the user to modify the source information. The group tag panel displays a group tag list comprising tag information for the group incident tag. The group tag panel comprises a tag user control configured to enable the user to add the group incident tag and to modify tag information. The incident list comprises the incident information of each of the plurality of grouped incidents. The incident information is selected from the group consisting of an incident name, an incident description, incident time data, cross-incident connections data, incident notes, associated incident tags, and combinations thereof. The incident user control is configured to enable the user to utilize the incident user control to modify the incident name, to create a new group incident tag, to associate the new incident tag with the grouped incident, to create incident notes, and combinations thereof.

The group visualization panel further comprises a sources visualization panel. The sources visualization panel comprises one or more group source graphics associated with each of the plurality of group sources. The one or more group source graphics comprise a source graphic visual characteristic representative of the source tenure of each of the plurality of group sources. The one or more group source graphics comprise a source graphic size proportional to the source incident count of each of the plurality of group sources. The navigation user control is further configured to enable the user to switch between the tag panel, the group sources panel, and the source visualization panel.

In another embodiment of the present invention, the group interface comprises an incident connection user control configured to enable the user to create or delete the second type of cross-incident connection. The group interface prevents the user from deleting the first type of cross-incident connection.

BRIEF DESCRIPTION OF THE SEVERAL VIEWS OF THE DRAWING

The advantages and features of the present invention will be better understood as the following description is read in conjunction with the accompanying drawings, wherein.

Figure 1:
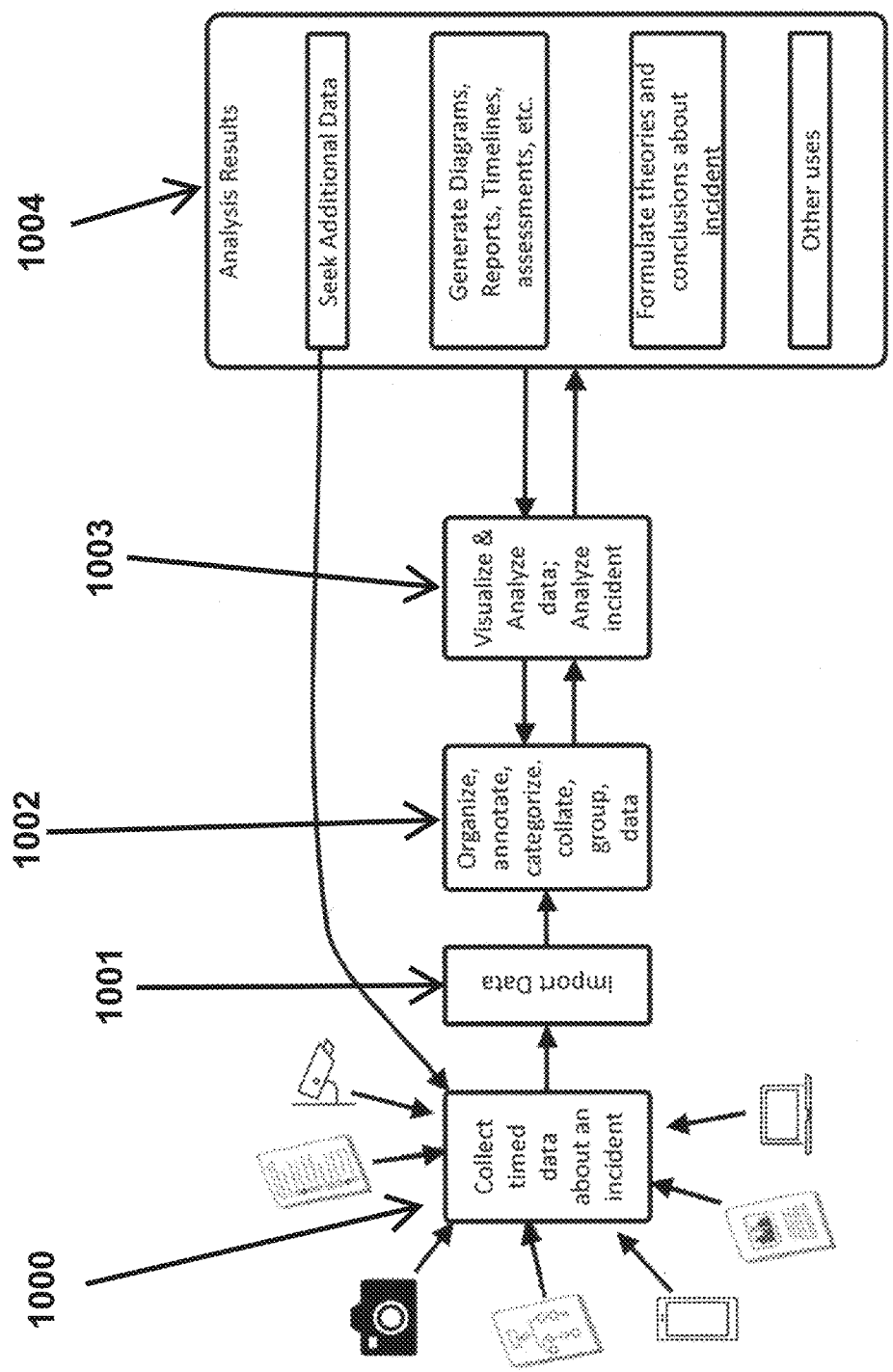
FIG. 1 is a diagram of an embodiment of the present invention.

For clarity purposes, all reference numerals may not be included in every figure.

DETAILED DESCRIPTION OF THE INVENTION

Embodiments of this invention may be implemented as systems comprising data storage, graphical displays, user controls, and computing interfaces between the graphical display, data storage, and user controls. Embodiments may be implemented on a single computing device, or may be implemented with distributed system architecture, such as a client device/workstation to graphically display data, a database, and any number of hardware and/or software layers in between.

An embodiment of the invention may be utilized and function as illustrated in FIG. 1, wherein incident data (e.g., data and other information about an incident) is collected in step 1000 and in step 1001 imported into a computer system configured to operate according to the invention. In step 1002 the data maybe aggregated and manipulated by grouping, sorting, annotating, categorizing, collating, and other methods of data aggregation, manipulation and organization to facilitate the analysis of the incident. The data may subsequently, in 1003, be visualized in different views, allowing an investigator, as step 1004, to obtain diagrams for incident reports, timeline of multiple events occurring before, during or after an incident.

Figure 2:
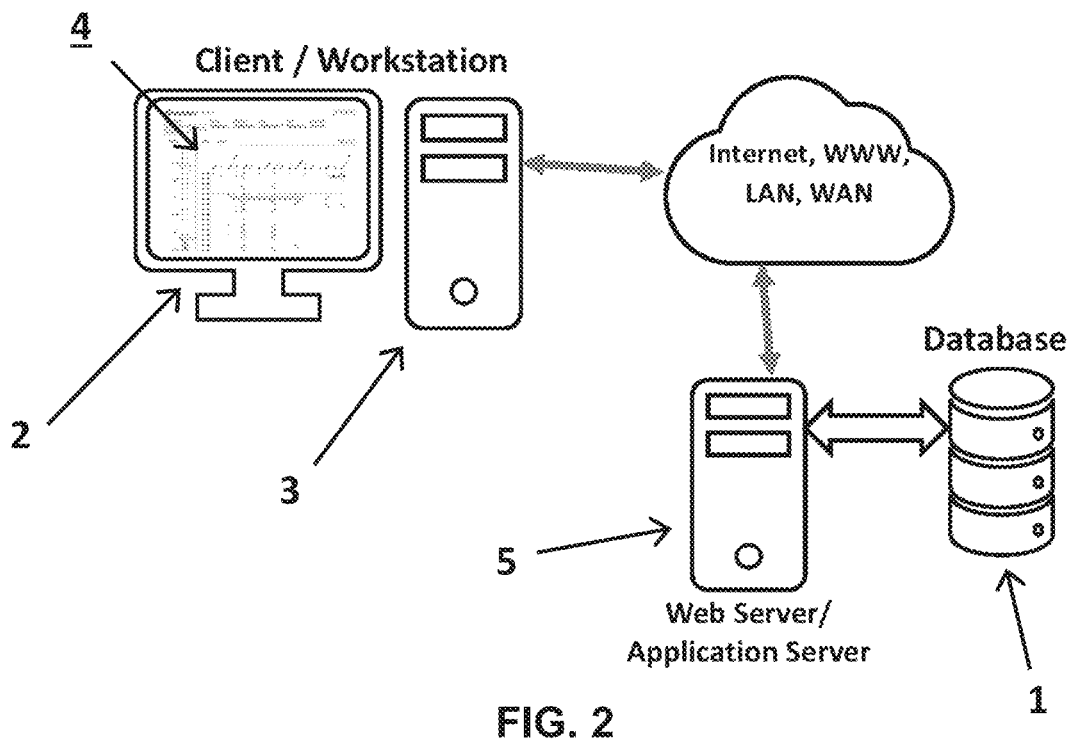
FIG. 2 is a diagram of an embodiment of the present invention.

In a preferred embodiment, illustrated in FIG. 2, the present invention maybe implemented as a distributed network system utilizing one or more Databases 1 and one or more workstations 3, comprising a display module 2, for displaying, visualizing and manipulating incident data stored in Database 1 through a Graphical User Interface ("GUI") 4. This embodiment may also comprise an Application Server 5 as a computing interface between Database 1, display module 2, workstation 3, and GUI 4. The GUI 4 provides efficient navigation through multiple views of the data associated with an incident. The Database 1 may be a relational or non-relational database, by way of example, MySqI, SQL, Oracle, Mongo, Cassandra, ElasticSearch and many others. In this embodiment, the Workstation 3 maybe any computing device such as a personal computer, laptop, tablet, mobile device, thin client, or any other device capable of displaying the GUI and connecting to a network (e.g., Internet, WWW, internal networks, and other public or private networks). The display module 2 may be any display module comprising a display (e.g., monitor, screen, projector, etc.) and a display controller (e.g., display hardware and software controlling the display), as well as any other hardware or software instrumentality, or interface known in the industry and necessary to properly operate the display module.

In a preferred embodiment the display module 2 may be part of workstation 3. Workstation 3 may display the GUI using a web browser capable of displaying any type of markup language (e.g., HTML, XML, SGML, etc.) or any other program capable of accessing and displaying information from a network. In an embodiment with more than one workstations 3, or display modules 2, each workstation/display module may display different aspects of the GUI 4 (e.g., input, control, annotation) permitting different users to perform different actions. Embodiments of the invention may also comprise firewalls or other security measures (not shown) between the Application Server 5 and a network, or between the workstation 3 and a public network.

Figure 3:
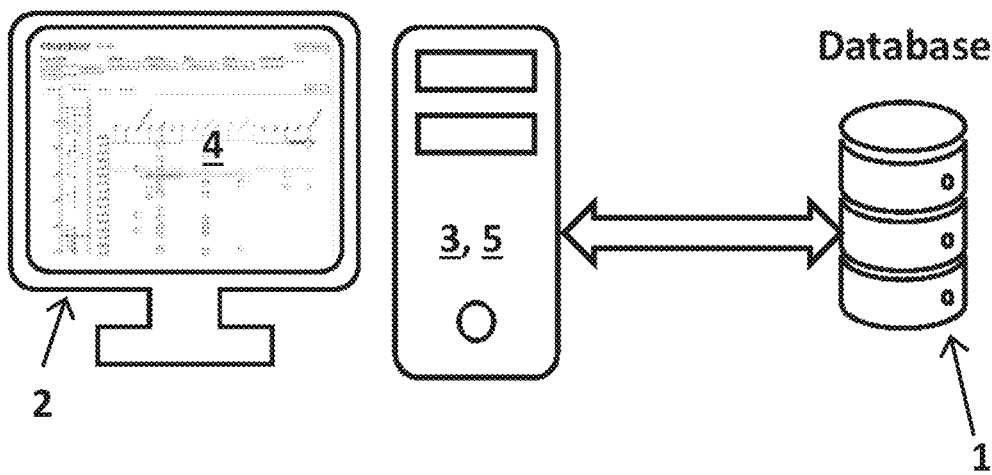
FIG. 3 is a diagram of an embodiment of the present invention.

Another embodiment illustrated in FIG. 3, may be implemented on a local network or even without any network connectivity. The Workstation 3, comprising display module 2, and Application Server 5 may be on the same computing device connected to the Database 1 as illustrated on FIG. 3. In other embodiments (not illustrated) the Workstation, Application Server, and the Database may be implemented on a single computing device.

An embodiment of the invention is a tool that can be used to collate, explore, and analyze one or more timestamped data sets about an incident to facilitate researchers performing incident analysis by facilitating the process of analyzing timestamped data sets. Once imported into the tool, the data sets may be searched, organized, tagged, and annotated in various ways, including a temporal visualization (e.g., along a timeline). This greatly facilitates a user's ability to explore and analyze verbal, behavioral, audiovisual, technical, and other data as means to develop deeper understandings of an incident.

Figure 4:
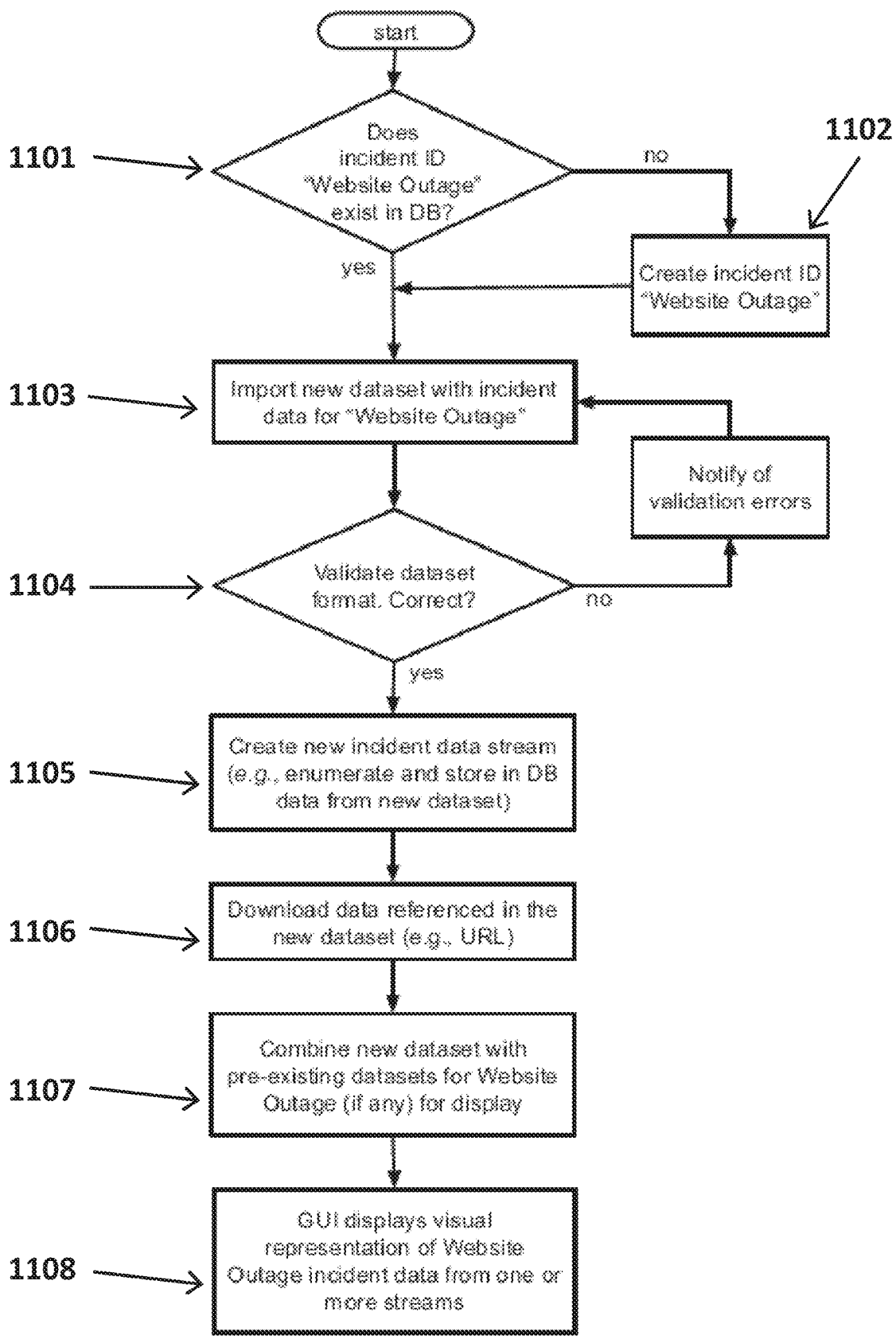
FIG. 4 is a diagram of a flowchart of an embodiment of the present invention.

FIG. 4 illustrates the use of an embodiment to visualize and analyze a website outage incident. If the incident has not been created, according to step 1101, in step 1102, a new incident "Website Outage" is created from the GUI 4. If the incident "Website Outage" already exists, the system skips 1102. In step 1103, a data set containing incident data associated with the Website Outage incident is imported, and the data set is validated in step 1104. If the data set format is correct, in step 1105 the incident data contained the data set is enumerated and stored in the Database 1 as an incident data stream. If any incident data content (e.g., image, video, object file, etc.) is provided by a link or reference (e.g., url, network or drive location) the content is retrieved from its referenced location in step 1106 and added to the stream. In step 1107 displayable incident data from all streams (e.g., enumerated incident data in data sets) associated with the Website Outage incident are aggregated for displaying, and in step 1108, the GUI displays a curated visual representation of the aggregated incident data permitting further manipulation, sortation, organization, annotation, tagging, grouping, etc.

An incident in steps 1101 and 1102 above refers to an analyzable incident, about which incident data exists, or can be collected, and organized into one or more data sets. An analyzable incident created within a system embodying the present invention comprises on or more incident identifiers, such as a name, title, label, number, or other identifier, corresponding to an analyzable incident. Incident data about the analyzable incident, including incident data from multiple data streams (e.g., enumerated data in data sets), may be associated with the incident identifiers for that incident thereby permitting all data to be manipulated and visualized as a whole. The incident identifiers may be used in step 1107 to aggregate all displayable incident data from multiple data sets (or multiple streams) associated with the same analyzable incident.

The terms "stream" and "data set" are largely interchangeable for the purposes of the present description. A stream refers to enumerated data from a data set, which is stored in Database 1. A data set should be understood broadly to include any set, collection, or aggregation of incident data, in any form, that has been collected, created or provided in relation to an analyzable incident, including flat files (e.g., in CSV, TSV, XML, or other formats), data streams, or even a single datum. Data in a data set and in a stream is timed, for example by associating each datum with a timestamp. Examples of the incident data that can be found in a data set or a stream include: online chat records and logs (e.g., Slack, IRC, Microsoft Teams, etc.), text transcriptions of interviews, software application logs (e.g., app. error logs, access logs, etc.), audio or video recordings (e.g., video conferences, telephone "bridge" calls) or transcripts of such recordings, images, other records, traces, or artifacts produced by the anomalies, events, incidents, or accidents, including ex post facto interviews and summaries. Each datum in a data set or stream represents an event 32, which was recorded as having occurred at its associated timestamp in the data set/stream.

An event 32 in a data set/stream may be a portion of text, portion of audio, portion of a videoframe, or one or more video frames, images or portions thereof, computer generated message, alphanumeric sequence, or any other information. An event's timestamp indicates a point in time when an event 32 occurred, is believed to have occurred, or was recorded, and may be used to perform one or more of the following: (i) preserve the sequential order in which an event appears in a data set or among events in combined data sets; (ii) visualize or calculate the time between events; (iii) enable navigations within the data sets; (iv) allow displaying the correct event data depending on the selected time interval; (v) support correlation of these data with information from other sources; (vi) support inferences about communications between sources over time; (vii) support inferences about the ordering of related events. An event 32 may also have an event duration, which may be used for visualizing concurrent or overlapping events, analyzing whether an event lasted too long or too short (e.g., an alarm going off for a long time unnoticed), whether an event 32 did not complete properly or may have been interrupted, and various others. In situations where events represent communications, or request-response exchanges (e.g., transcript, trace, audio/visual format, etc.) event duration can help assess the circumstances, duration, and sequence of communications, for example whether a statement or action may or may not have been in response to a statement (e.g., if the response began prior to the end of duration of the statement).

Events 32 also may have an event source 35 or actor 35 (e.g., the source of the datum corresponding to that event), which may be a person or device that produced the event 32 (e.g., text, image, video, sound, alarm, computer notification, log entry, error code, etc.), for example a participant or observer of an incident, video or still camera, microphone, monitoring or trace software, computers, GPS trackers, sensors, and others. The actors, or event sources 35, of each event 32 may be part of the data set. For this disclosure the terms "actor" and "event source" are used interchangeably.

Embodiments of the invention allow a user to assemble, validate, and explore all or parts of a data set, and multiple data sets associated with an incident, and to do so efficiently and nondestructively while producing a record of the user's activities. For example, an embodiment of the invention may perform one or more of: generating, manipulating, and comparing different views of data sets allowing a user to make inferences about anomalies, events, accidents or other occurrences associated with an incident; annotating the data sets so that user's inferences are recorded and become part of the enhanced data sets; and allowing the enhanced data together with the analytical references to be recorded, communicated, or supported by references to the original data sets. A user also may hide or unhide an entire stream/data set or the user may hide/unhide one or more individual actors (event sources) 35. Events from a hidden stream are not displayable regardless of whether the actor is hidden or unhidden. Events associated with a hidden actor also are not displayable regardless if those events are part of a hidden or unhidden stream. Only events by unhidden actors in unhidden streams are displayable.

Figure 5:
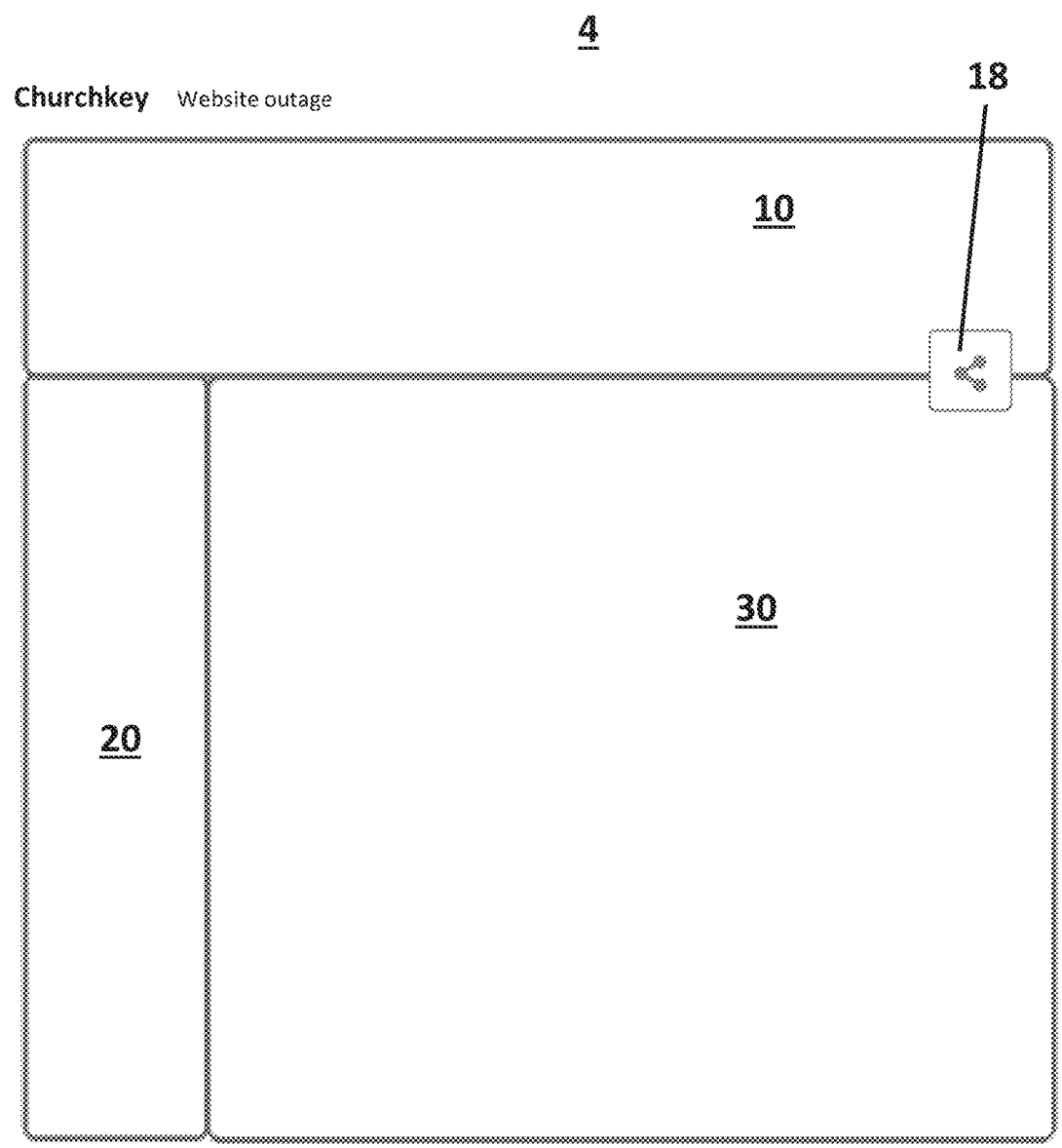
FIG. 5 is a diagram of a GUI in an embodiment of the present invention.
Figure 6:
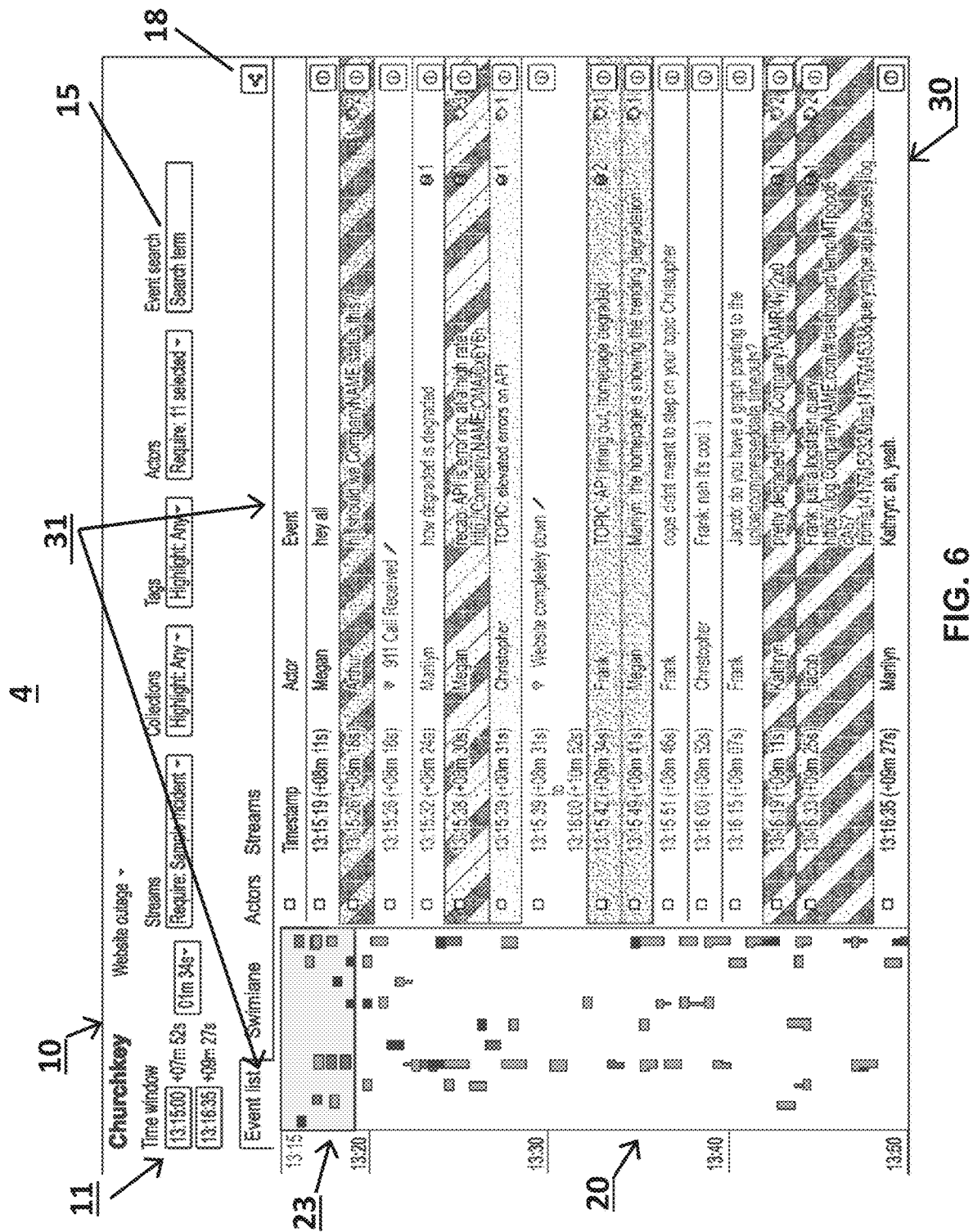
FIG. 6 is a diagram of a GUI in an embodiment of the present invention.
Figure 7:
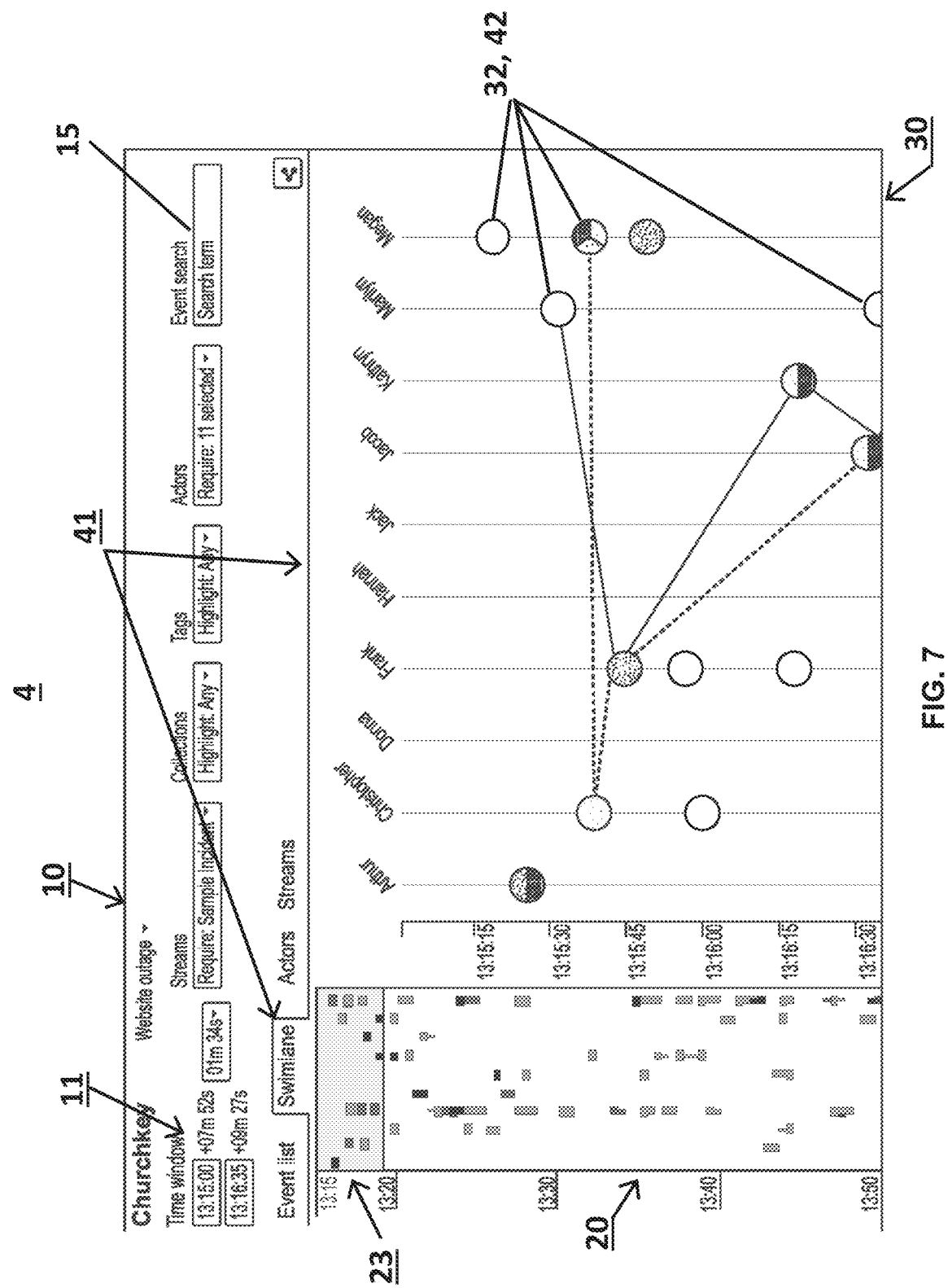
FIG. 7 is a diagram of a GUI in an embodiment of the present invention.

Displayable events are displayed in a Graphical User Interface 4, as illustrated in FIGS. 5, 6, 7. When displayable events originate from multiple data sets all displayable events are interleaved via their timestamps. The Graphical User Interface 4 comprises a Control Panel 10, Event Mapping Panel 20, and an Annotation Panel 30. The GUI Panels 10, 20, and 30, are logically and graphically related in a unique manner that allows data to be visualized in parallel different but related perspectives on the data sets being represented. Embodiments of the invention further allow a user to specify, or adjust (e.g., magnify, or reduce) the time interval displayed in the Annotation Panel 30, show or non-destructively (e.g., without altering the data sets) hide one or more event sources on the Annotation Panel 30. Embodiments of the invention also allow a user to switch the Annotation Panel between different views while maintaining the data manipulation and the time interval of displayed data between views. Embodiments of the invention also allow users to share the current visualization state of GUI 4 and/or display module 2 by using the Share Control 18. For example, clicking the Share Control 18 may cause the system to generate a reference (e.g., a URL) which represents the viewable state of the GUI 4 and display module 2 (e.g., displayable events, time filtering, display time interval, tags, collection, highlighting, and other data visualizations rules). The reference may then be shared with others (e.g., sitting at a different location) who upon following the reference will be able to view the GUI 4 in the state recorded by that reference.

Figure 10:
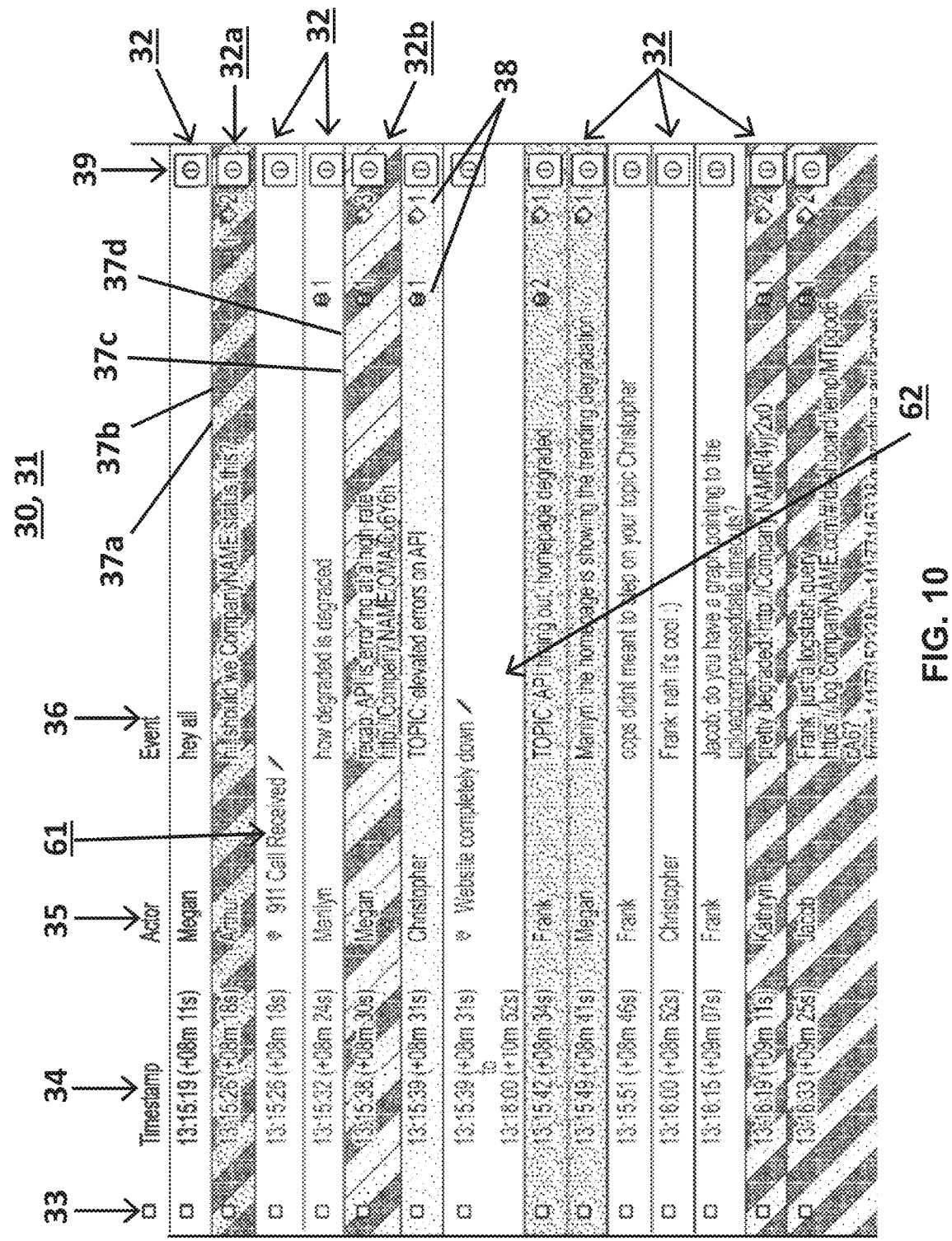
FIG. 10 is a diagram of an Event List View of a GUI in an embodiment of the present invention.
Figure 11:
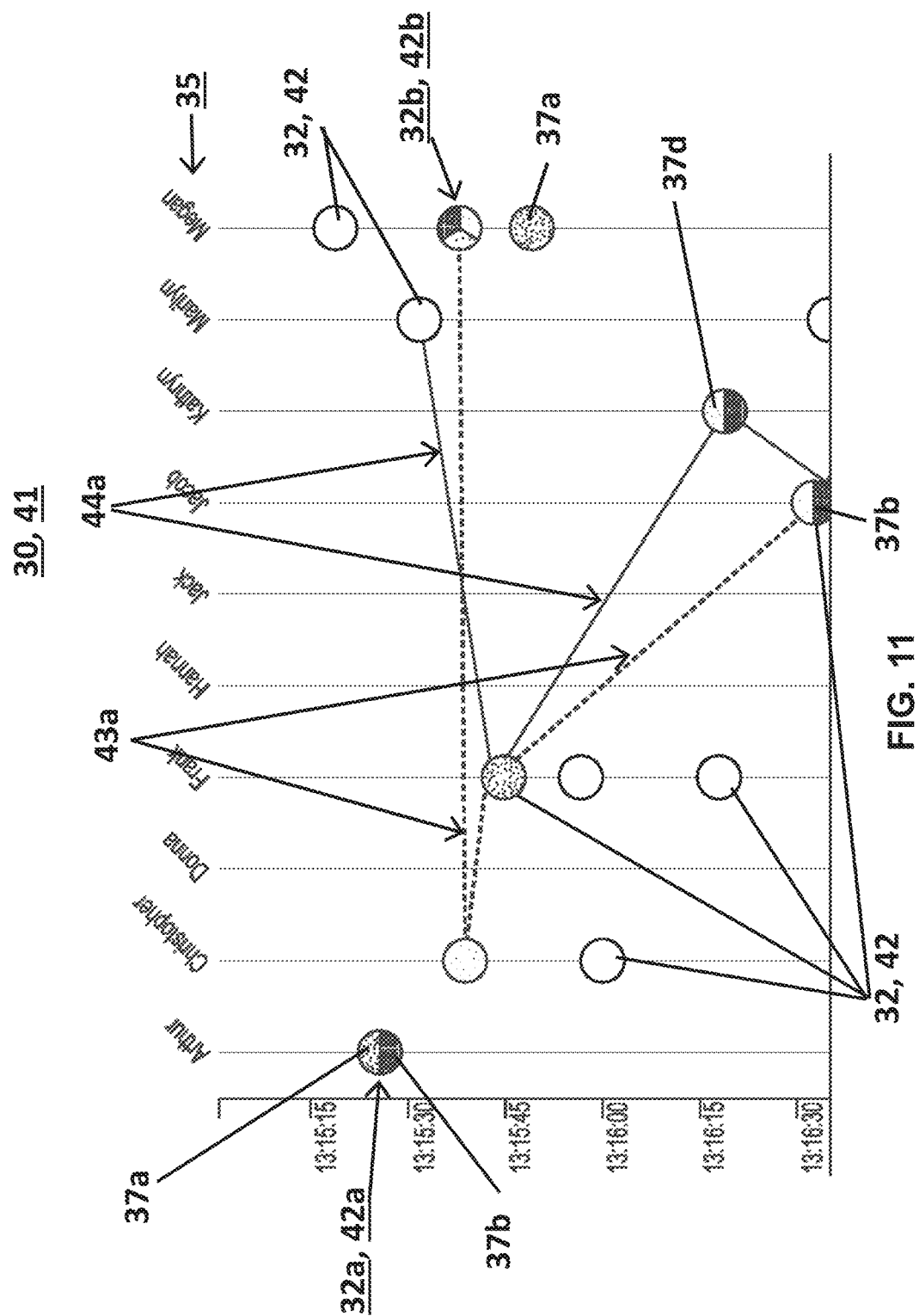
FIG. 11 is a diagram of a Swimlane View of a GUI in an embodiment of the present invention.
Figure 12:
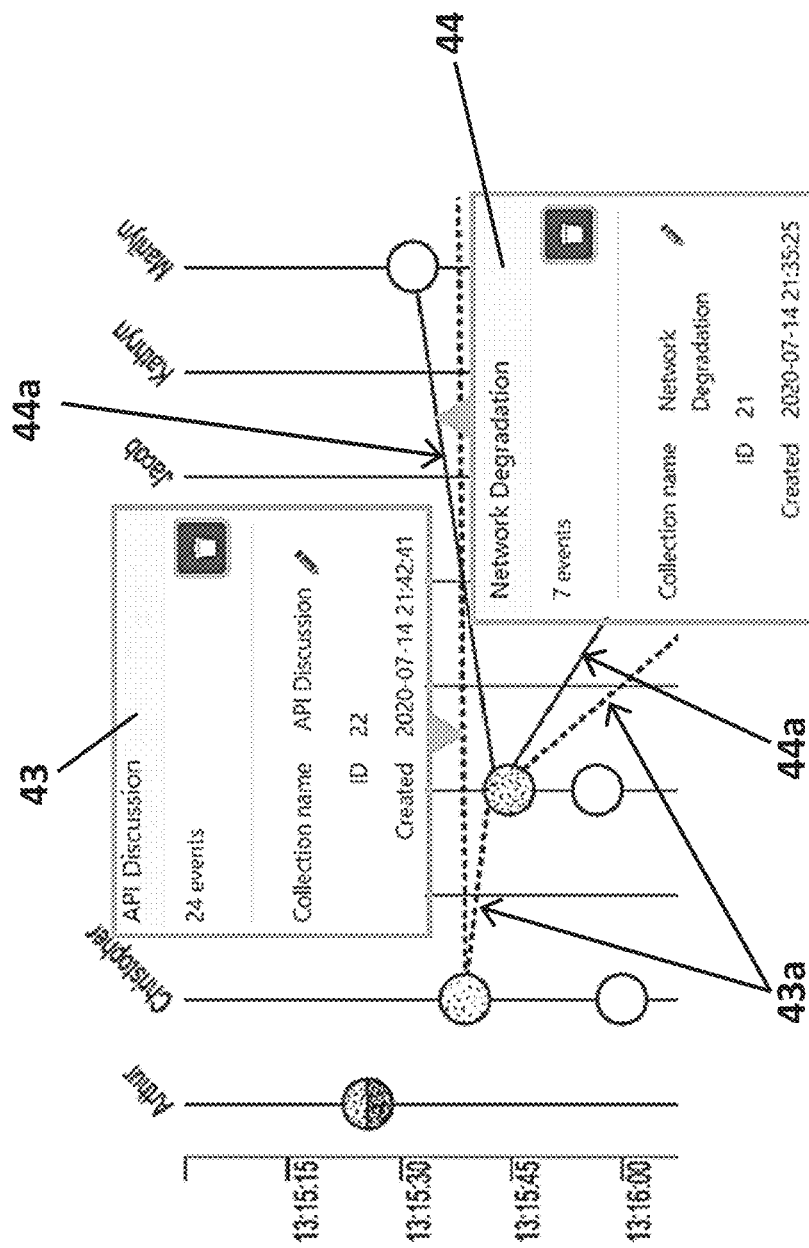
FIG. 12 is a diagram of visual user controls in an embodiment of the present invention.
Figure 15A:
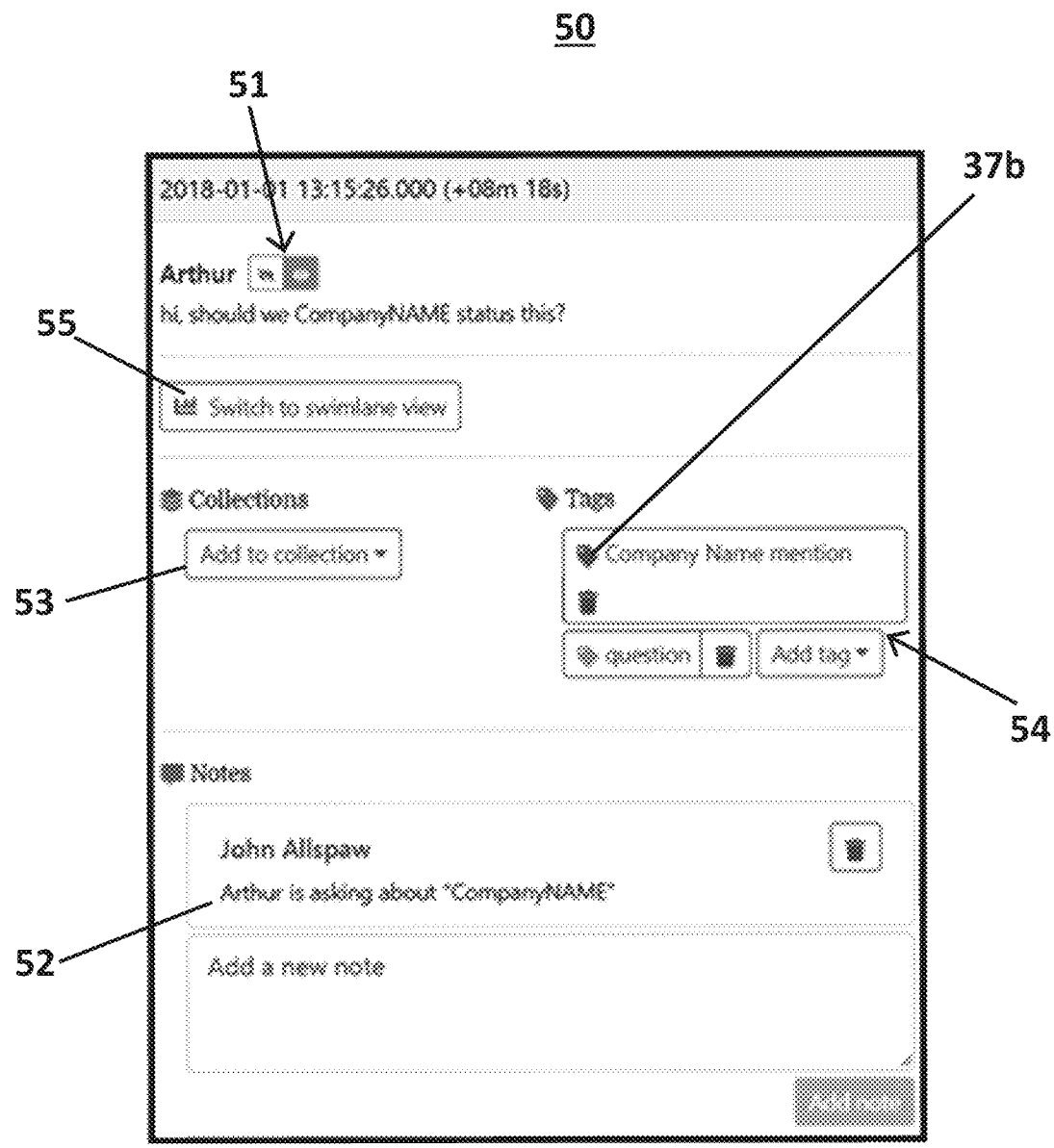
FIGS. 15A, 15B are diagrams of an Event Control Panel in an embodiment of the present invention.
Figure 15B:
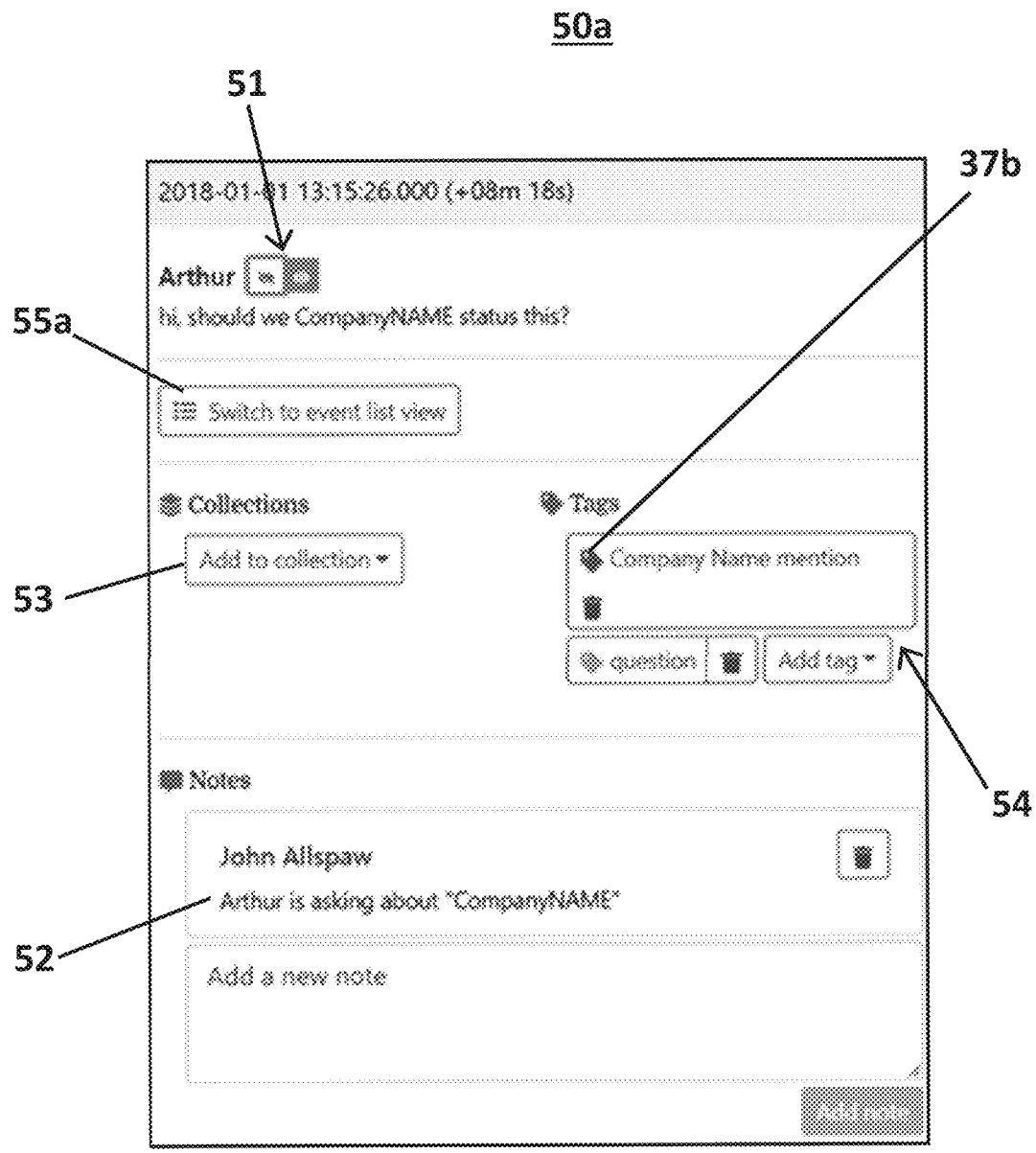

One or more events can be grouped into an event collection 43, 44, as illustrated in FIGS. 11, 12, and each event may participate in one or more event collections. Each collection may have a unique identifier, and/or a descriptive name, for example "API Discussion" for collection 43, or "Network Degradation" for collection 44. Events may be tagged (or associated) with one or more tags 37a, 37b, 37c, 37d, as shown for example in FIGS. 6, 7. FIGS. 15A and 15B, as discussed in more detail below, illustrate one way of creating tags and associating tags with events 32. Each tag may have a unique visual characteristic or identifier (e.g., color, patterns, shape, icon, etc.), and/or a descriptive name. For example, Tag 37b, which may be red on a color display, has a name "Company Name mention," and is illustrated in FIGS. 6, 7, 10, 11 with a stippling (dotted) pattern with 25% dots. Other tags illustrated in the Figures include 37a, 37c, and 37d, each shown with a different stippling.

Figure 8:
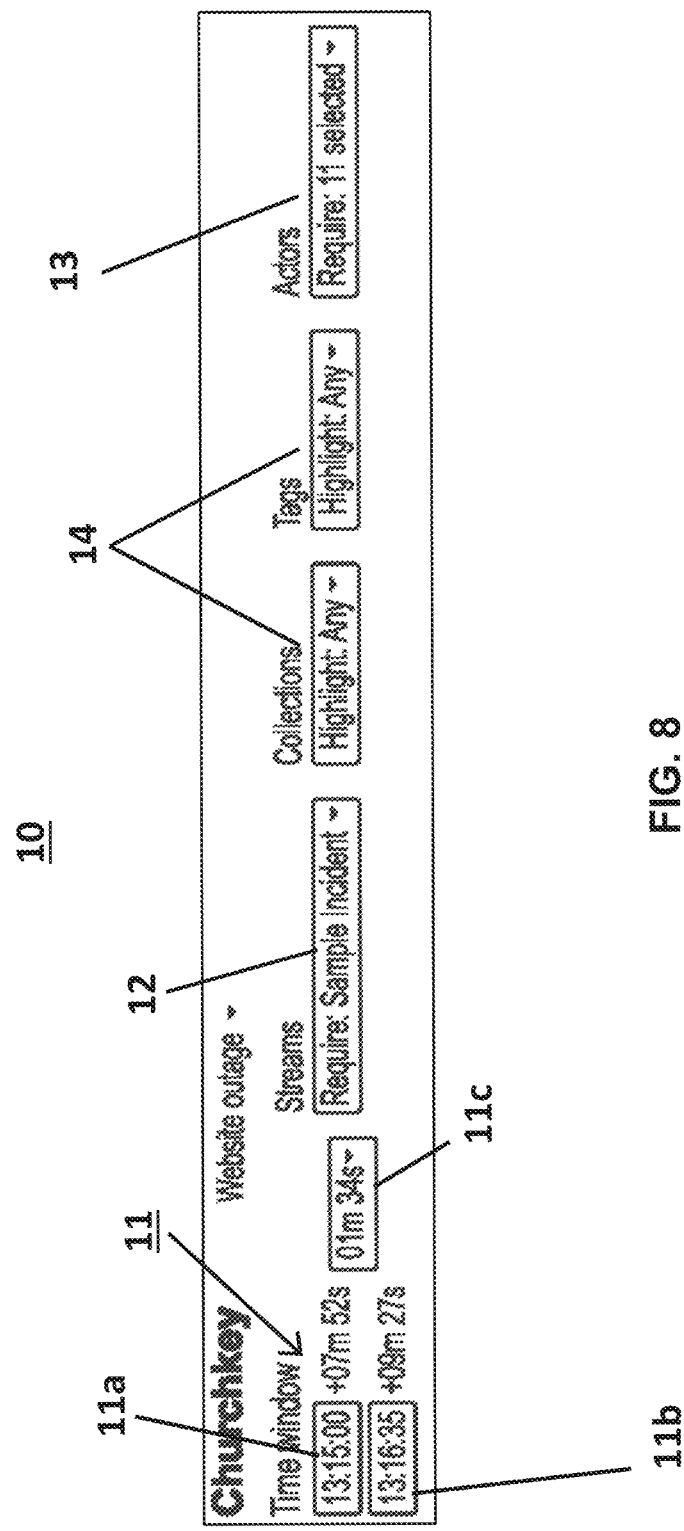
FIG. 8 is a diagram of a Control Panel of a GUI in an embodiment of the present invention.

An embodiment of a Control Panel 10, illustrated in FIG. 8, may include various user controls, for example display time interval control 11 for adjusting the display time interval, Hide/Unhide controls 12, 13 for hiding or unhiding one or more streams and/or one or more actors (event sources), and highlighting controls 14 for highlighting collections of events and highlighting tags associated with events. When an event collection 43, 44, is highlighted the Annotation Panel 30 and Event Mapping Panel 20 may visually indicate which events belong to which event collection. When a tag 37*a*, 37*b*, 37*c*, 37*d*, is highlighted the Annotation Panel 30 and Event Mapping Panel 20 may visually identify events associated with the highlighted tag. The Control Panel may also include a search box 15 for searching events. The time interval control may also indicate the start time 11*a*, the end time 11*b*, and duration 11*c* of the display time interval.

Figure 9:
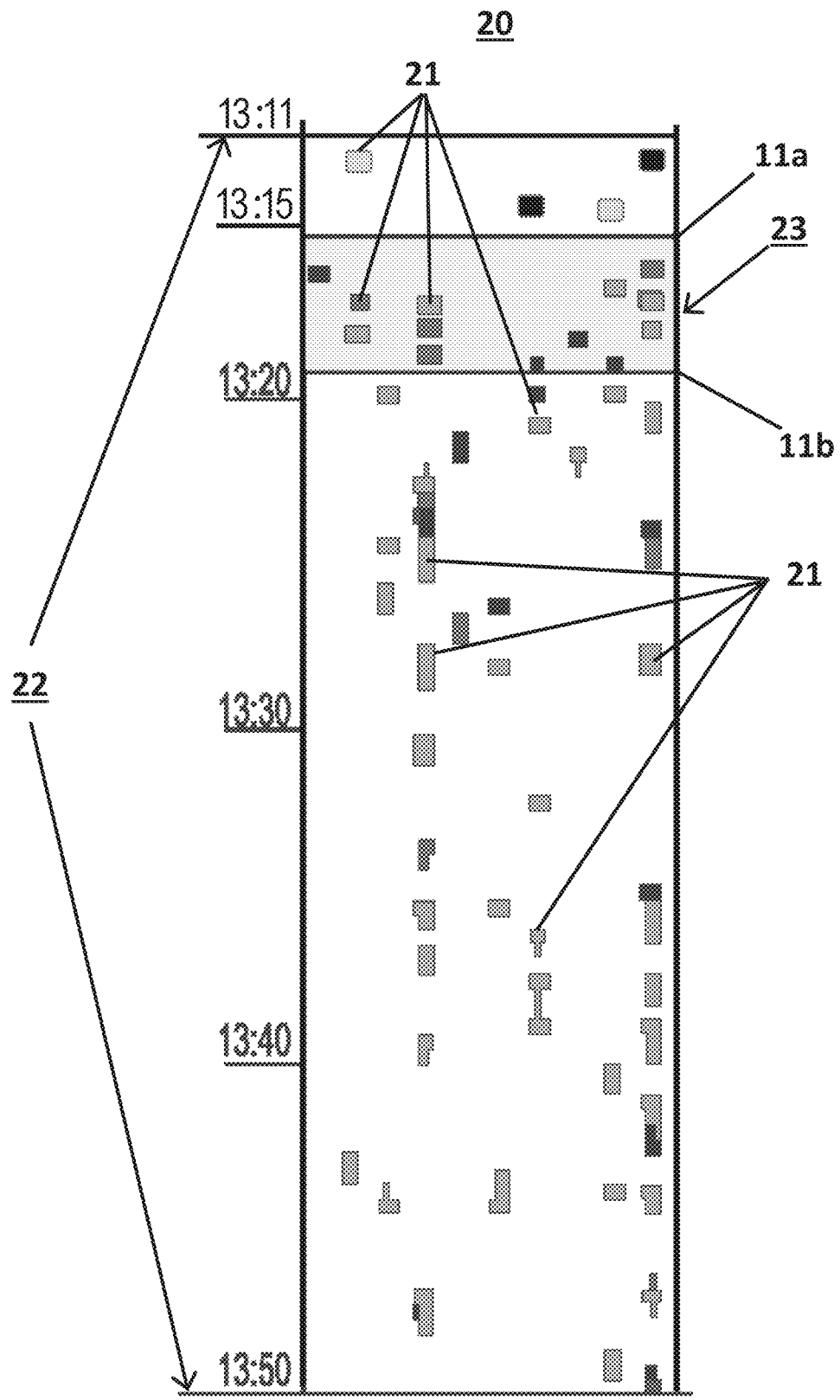
FIG. 9 is a diagram of an Event Mapping Panel of a GUI in an embodiment of the present invention.
Figure 14:
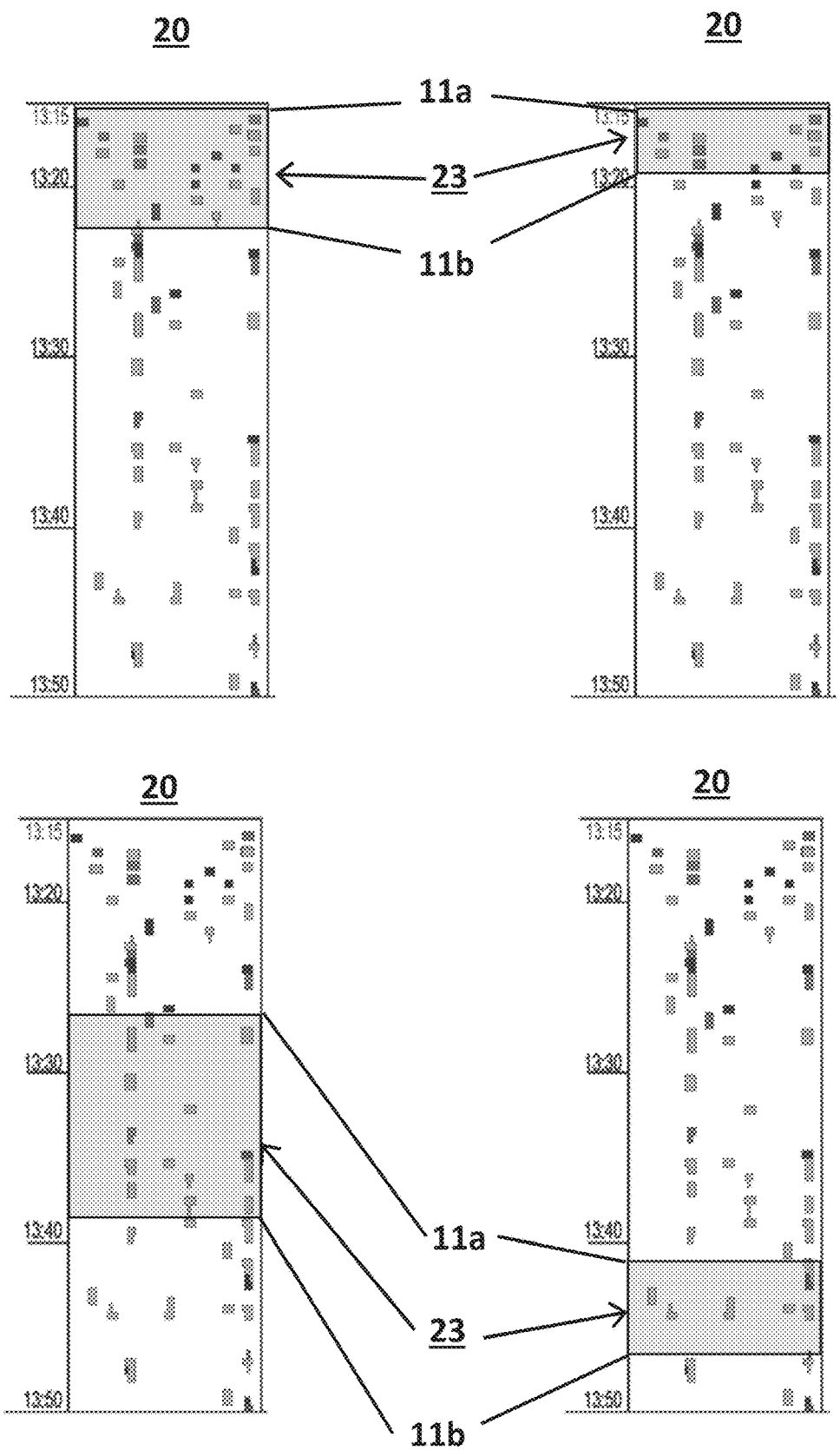
FIG. 14 is a diagram of multiple views of an Event Mapping Panel of a GUI in an embodiment of the present invention.

In the Event Mapping Panel 20 illustrated in FIG. 9 each displayable event is visually represented by an event symbol 21. Event Mapping Panel 20 displays event visual representations in the form of event symbols 21 of all displayable events during the entire time period 22 for which data is present in the data sets. Each event symbol 21 may indicate if an event is associated with one or more tags 37*a*, 37*b*, 37*c*, 37*d*, (distinguished, e.g., by color, pattern, etc.), for example, as illustrated on FIG. 9, by shading the appropriate event symbol 21 in different shades of grey. The Event Mapping Panel comprises a user adjustable display time interval selection graphic 23 that highlights the display time interval for which events 32 are displayed in the annotation panel and corresponds to the display time interval in control 11 in the Control Panel 10. A user may adjust the interval selection graphic 23 by clicking (or touching) and dragging the start time 11*a* (top border) or end time 11*b* (bottom border) of the graphic 23 to enlarge or reduce the display time interval, or a user may move the entire graphic 23 along the timeline to select a different time interval, as illustrated on FIG. 14.

Events from one or more data sets corresponding to the display time interval 11*a*-11*b*, selected in the Control Panel time interval control 11 or in Event Mapping Panel graphic 23 are displayed in Annotation Panel 30. Annotation Panel 30 may show displayable events in Event List View 31, or Swimlane View 41. The selected display time interval together with the portions of the data sets appearing in the Annotation Panel 30 are visually highlighted in the Event Mapping Panel using the graphic 23, as explained above. This allows an analyst to examine a specific period within the data set while maintaining orientation regarding the selected display time interval's relation to the entire time period 22, and the number of events in the selected display time interval in relation to the events in the entire time period.

The Annotation Panel 30 and Event Mapping Panel 20 are linked via the Control Panel 10 allowing manipulation of the Annotation Panel's time interval by setting the selected time interval's start and end point from the Event Mapping Panel, or by entering the start time and end time into the Control Panel. Any changes in the interval selection graphic 23 will be reflected in the interval control 11 in the Control Panel 10, and vice versa. Changes in either the interval selection graphic 23 or display time interval control 11 will update the events 32 displayed in the Annotation Panel 30.

The GUI 4 allows the data in the Annotation Panel to be displayed in different representations or views that annotate the data. An embodiment of the invention allows data to be displayed in a Swimlane view 41, illustrated in FIG. 11, or in Event List view 31, illustrated in FIG. 10, and enables easily switching between the two views while maintaining selected display time interval, annotations, and other data manipulation. In Swimlane view 41 the data visualization allows easy observation of number, frequency and cadence of events during the selected time interval, as well visual identification of sources who were active during the interval. In Event List 31 view the data visualization allows easy visual examination of the exact sequence of events.

The Swimlane View 41 of the Annotation Panel, FIG. 11, is a graphical representation of displayable events from one or more unhidden data sets with the timestamps along the vertical axis, and actors along the horizontal axis. Each unhidden event source (or actor) 35 is represented as a column ("actor column"), in which each event 32 is represented by an event icon 42, so that the tempo and frequency of contributions from each source/actor is directly visually perceptible. The heading of each actor column identifies the event source (actor) 35 of the displayable events 32 in the actor column. For events for which an actor is not available (e.g., not provided in the data set, unknown, uncertain, etc.) the heading of actor column may be left empty, or may be indicated, for example, as "unknown," "unavailable," or similar. In Swimlane View each displayable event 32 is represented by an Event Icon 42 (e.g., geometric figure, image, thumbnail, emoji, etc.) that may be augmented to show the event's participation in a highlighted collection 43, 44, or the event's association with one or more highlighted tags 37*a*, 37*b*, 37*c*, 37*d*. For example, each highlighted collection may be represented by a line 43*a*, 44*a*, with characteristics (e.g., line style, color, weight) corresponding to that collection. Events belonging to a collection may be visualized by connecting the events from that collection with a line characteristic of that collection. For example, in FIG. 12, collection "API Discussion" 43 is represented by a dashed line 43*a*, while collection "Network Degradation" 44 is represented by a solid line 44*a*. Instead of dashed and solid lines, different collections may be visually represented using different visual characteristics, for example different types of dashed lines (e.g., longer or shorter dashes, dotes, or combinations thereof), different colors, line weights or thicknesses, and combinations thereof.

Figure 13:
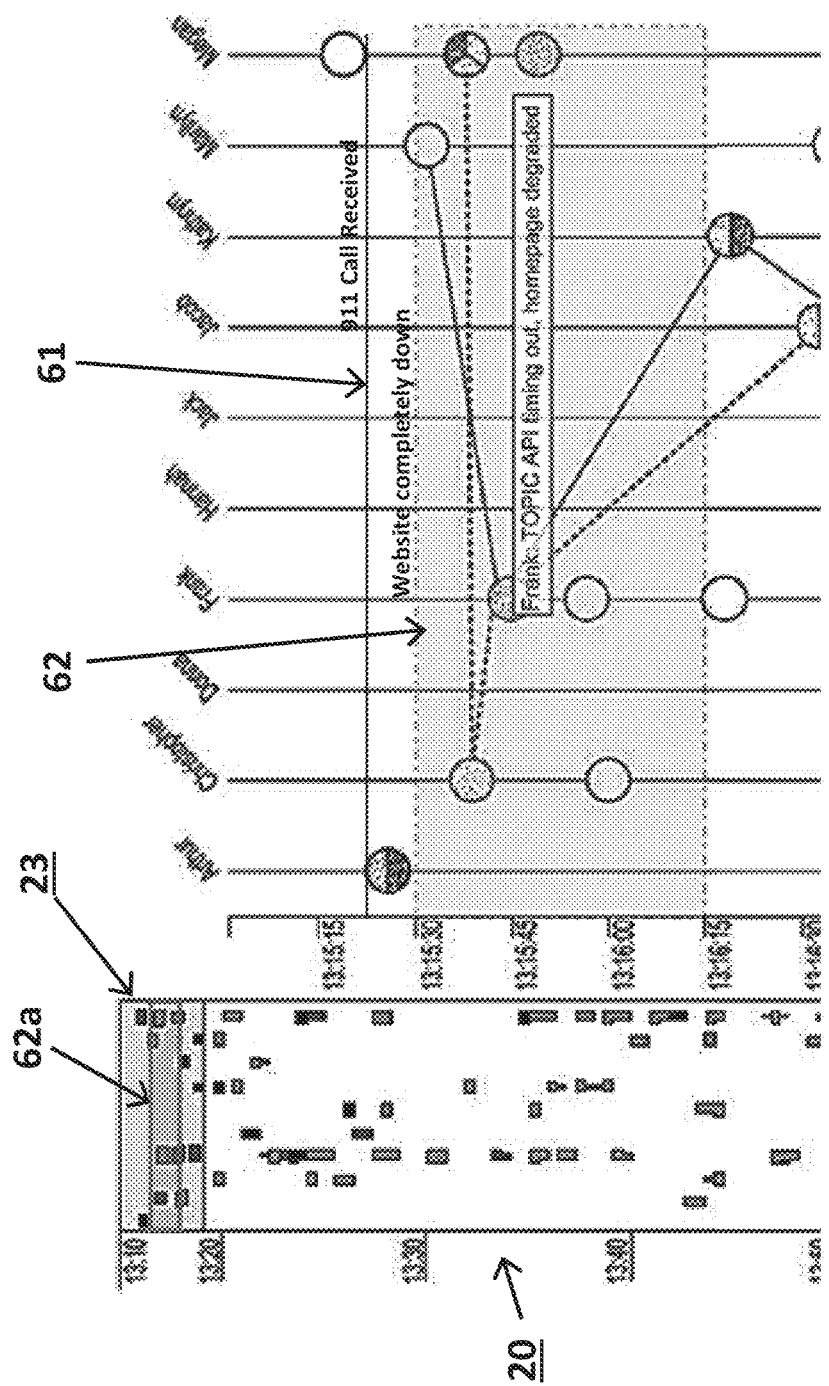
FIG. 13 is a diagram of a Swimlane View of a GUI in an embodiment of the present invention.

The Event Icons 42 may contain color, shading, patterns, images, or other visualization representing tags. For example, in one embodiment, the event icons 42 are circles containing one or more colors (represented as different levels of stippling in the Figures) indicating how many, and which highlighted tags 37*a*, 37*b*, 37*c*, 37*d* each event is associated to. For example, event icon 42*a* visually indicates that event 32*a* is associated with two highlighted tags 37*a* (Green—"Homepage Mention"), and 37*b* (Red—"Company Name"). Similarly, Event icon 42*b* illustrates three tags associated with event 32*b*. The event icon 42 may be utilized to perform different functions, for example to view the content of an event, to annotate the event, to rearrange the actor columns, and others. For example, hovering over an event icon may show the event content (e.g., text, image, etc.) as illustrated in FIG. 13, while clicking on the icon displays an event information and control panel ("Event Control Panel") 50*a* illustrated in FIG. 15B. A user may also drag an event icon to rearrange the view, for example by re-positioning the actor (event source) column to which the dragged event belongs. Instead of hover, click, and drag, a user may single click, double click, right or left click, touch with one or more fingers, etc., on the event icon to display the content, invoke the Event Control Panel 50*a*, or to perform other functions.

Event List View 31 is a tabular representation in which each event may be represented by a horizontal arrangement (e.g., an event row) showing the content of the event (e.g., image, text, etc.), and one or more of the event's timestamp, event source, and other details that may be available. As illustrated in FIG. 10, Event List View 31 displays events 32 from one or more unhidden data sets in vertical chronological order, with the timestamps displayed along the vertical axis in a manner that corresponds to the way that sequential or timestamped data is normally represented by the output of or commands entered from the command line, e.g., in the way that a person would see this data displayed by the computer programs usually used from the command line. The event list view 31 may comprise a selection box 33, an event timestamp 34, an event source 35, event content 36, event origin data set (not shown), representation of tags or other annotations (e.g., through color coding, patterns, etc.) 37a, 37b, 37c, 37d, visual indicators 38 of the event's association with one or more tags and/or event collections, and at least one associated user control 39. For example, as FIGS. 10, 11 illustrate, event 32a with a timestamp 34 of "13:15:19" from event source 35 of "Arthur" is associated with tags 37a, 37b. Similarly, event 32b with a timestamp 34 of "13:15:38" from event source 35 of "Megan" is associated with three tags 37b, 37c, and 37d. The associated user control 39 may be utilized to annotate (for example by adding a note, a tag, adding the event to a collection, etc.) the event, hide or unhide actors, switch the Annotation Panel 30 to a different view, and other functions. In some embodiments, shown in FIGS. 10, 15A, the associated user control 38 is a button, which displays Event Control Panel 50. In some embodiments, shown in FIGS. 11, 15B, the associated user control 38 is a button, which displays the Event Control Panel 50. In event list view actor 35 identifies the event source (actor) of the displayable event 32. For events for which an actor is not available (e.g., not provided in the data set, unknown, uncertain, etc.) the actor 35 may be left empty, or may indicate, for example, "unknown," "unavailable," or similar.

Event Control Panel 50, 50a shown on FIGS. 15A, 15B, displays available information about an event 32, and may also provide user controls, for example Hide Control 51 to hide or unhide all events from the event's actor; Note Control 52 to add notes to an event; Collections Control 53 to add the event to an event collection 43, 44, or to create, label, and retrieve event collections 43, 44; Tag Control 54 to create and attach Tags 37a, 37b, 37c, 37d, to events. Event Control Panel 50, 50a also provides a View Control 55, 55a that switches the view of the Annotation Panel 30 from Event List View 31 to Swimlane View 41, and from Swimlane View 41 to Event List View 31.

Figure 16A:
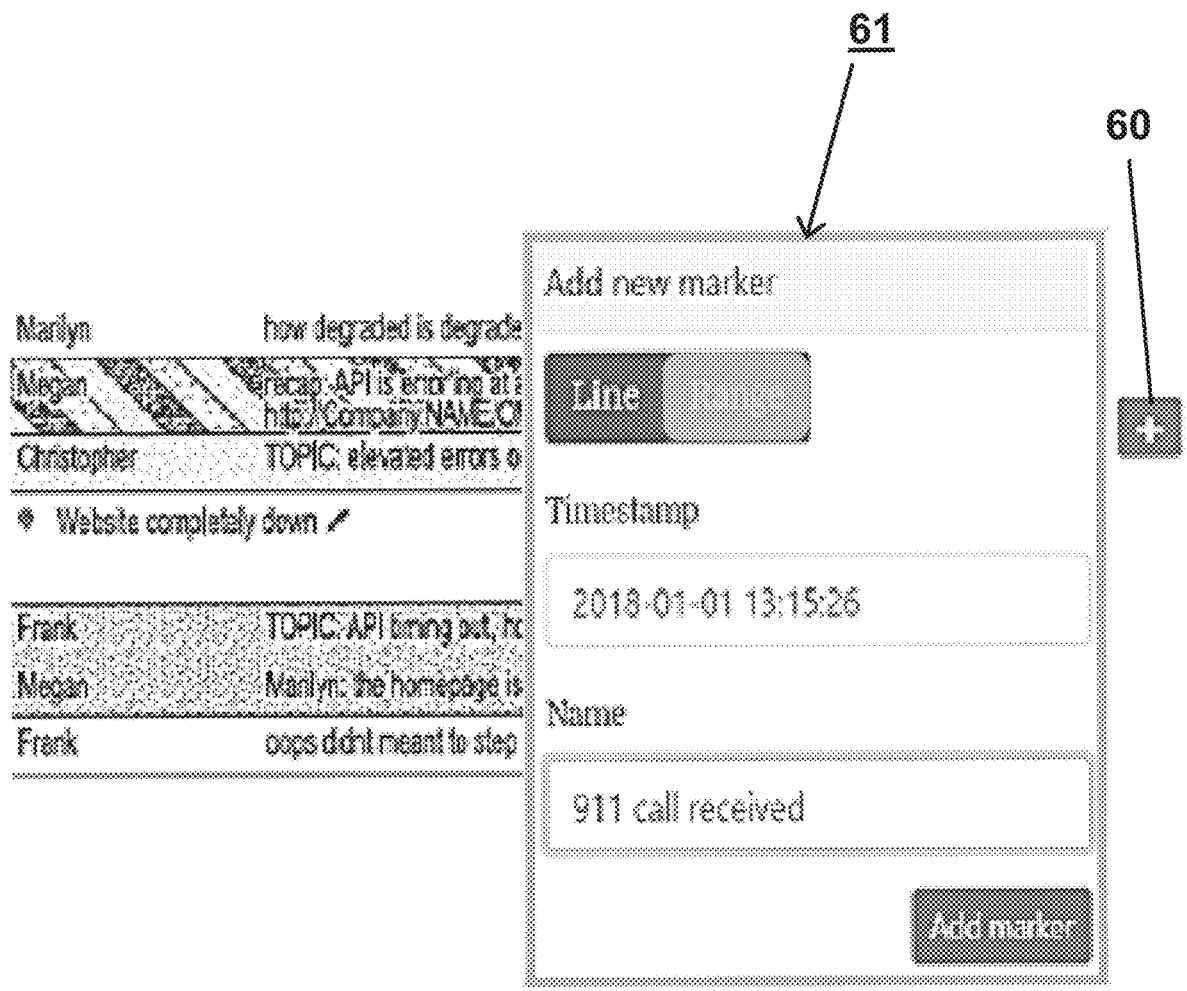
FIGS. 16A, 16B are diagrams of visual user controls in an embodiment of the present invention.
Figure 16B:
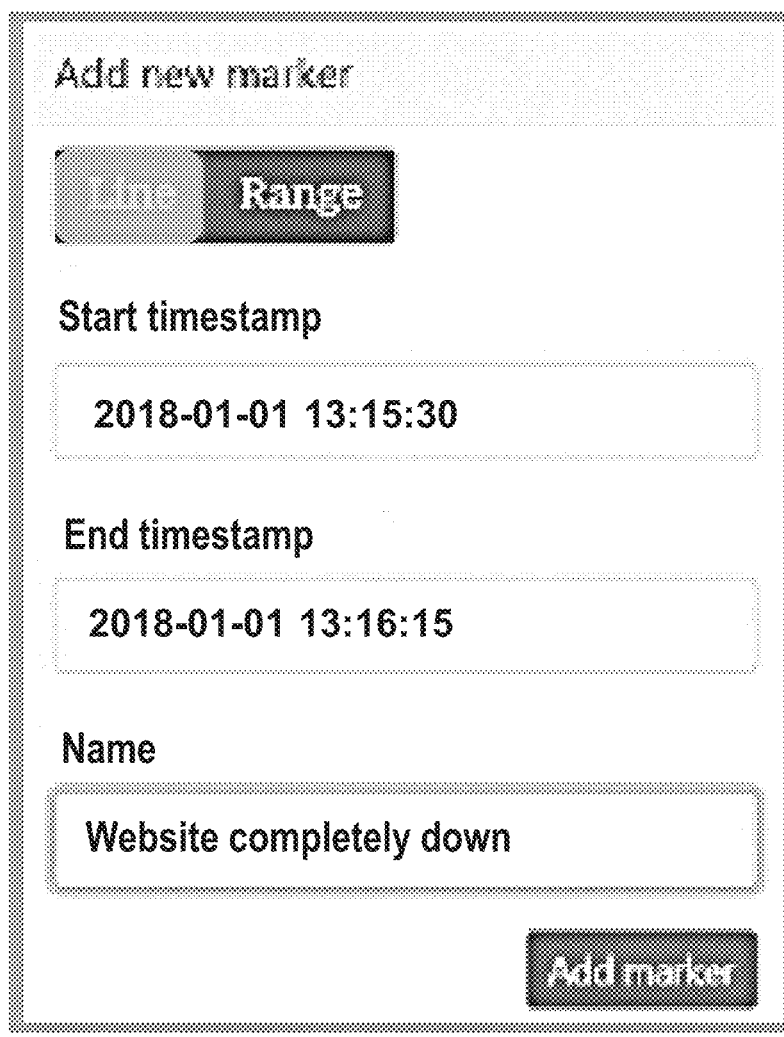
Figure 17:
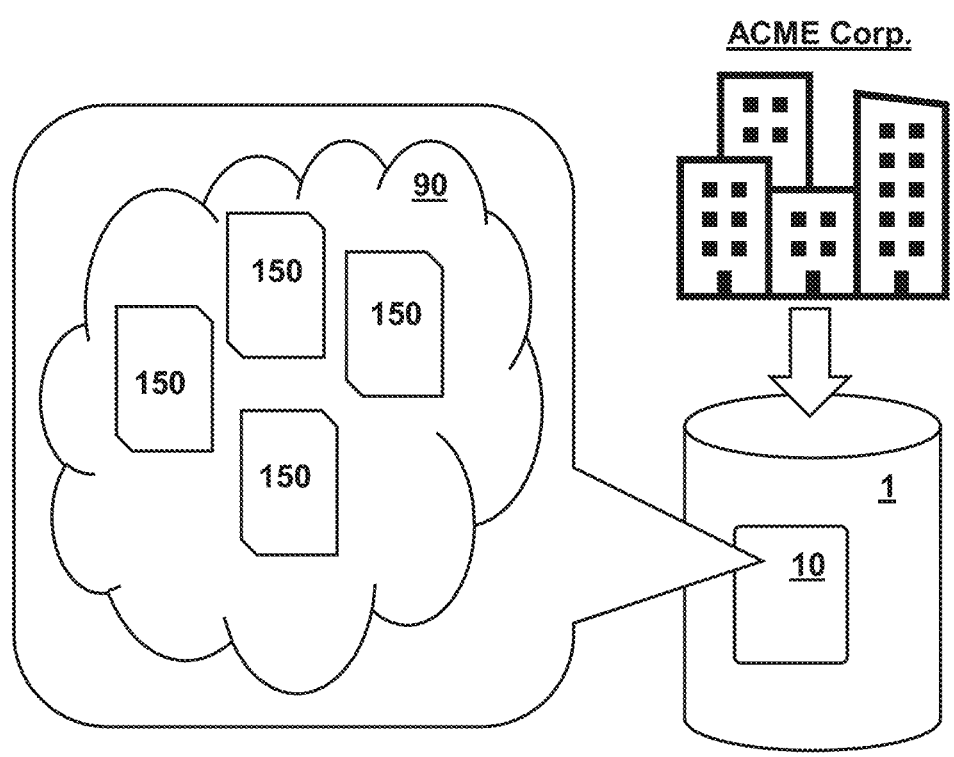
FIG. 17 is a diagram of an embodiment of the present invention.

The Annotation Panel 30 may also provide a user marker control 60 that when activated brings up marker control panel illustrated on FIGS. 16A, B, allowing the creation of Markers 61 or Marker ranges 62, visually indicating a specific time (e.g., "Line") or time range (e.g., "Range"). Markers may represent occurrences or circumstances that may be important to the analyzable incident, for example time of "911 call received" marker 61, or time range of "Website completely down" marker range 62. The Annotation Panel 30 provides visual indications of Markers 61 and Marker Ranges 62 as illustrated on FIG. 13 for Swimlane View 41, and on FIG. 10 for Event List View 31, allowing observation of events that occurred contemporaneously with occurrences or circumstances represented by the Markers or Marker Ranges. The Event Mapping Panel 20 also may visualize the location of Markers 61 (not shown) and the range 62a of Marker Ranges 62.

Embodiments of the invention may be configured to differentiate between different users and users' roles, for example based on log-in credentials and authentication. To achieve such differentiation, a system according to an embodiment of the invention may detect a user's identity (e.g., through IP address, cookies, etc.), or GUI 4 may provide user log-in or authentication controls and require users to provide to log-in and authenticate before accessing data 10. The system may utilize an identity authentication and management (IAM) system that may be external to the system or may be incorporated within the system. Users may have different roles, such as data analysts who may be responsible for analyzing and annotating data 10, data managers and data admins who may be responsible for importing data and maintaining data and database integrity, supervisors, technicians, managers, and others. Systems according to this invention may be configured to recognize a user's role and allow access according to the user's role, or the systems may be configured to prevent users from accessing certain functionality and data based on the user's identity, role, or both.

Embodiments of the invention may be configured to comprise workspaces, or environments, allowing granular access to data and functionality associated with individual users ("user workspace"), associated with a particular user role (referred to as role "environments," for clarity), or both. Workspace and environment are used interchangeably here, to designate a data collection associated with a user, a user role, or both. Data records may be associated with, or part of, one or more workspaces or environments. For example, all analyst users may be allowed to view and/or change certain incident data, for example certain types of cross-incident connections, incident and event notes, and incident and event links, while not allowed to view and/or change other types of incident data. Embodiments of the invention may associate user-created incident data with a user workspace and/or a role environment. For example, an analyst-user-created incident and event tags, notes, links, cross-incident connections, and other incident data may be associated with the user workspace of the user who created them, and also may be associated with an analyst environment containing incident data created by multiple analysts. Embodiments of the invention, may then enable only a user associated with a workspace or environment to view and/or modify data therein. For example, an analyst-user may be allowed to modify user-created information only in that analyst-user's workspace, and/or may be allowed to view, but not modify, user-created incident data in the analyst environment. In another example, a user with a manager role, may be allowed to view and modify all user-created incident data in the analyst environment, but not in a data admin environment.

Figure 18:
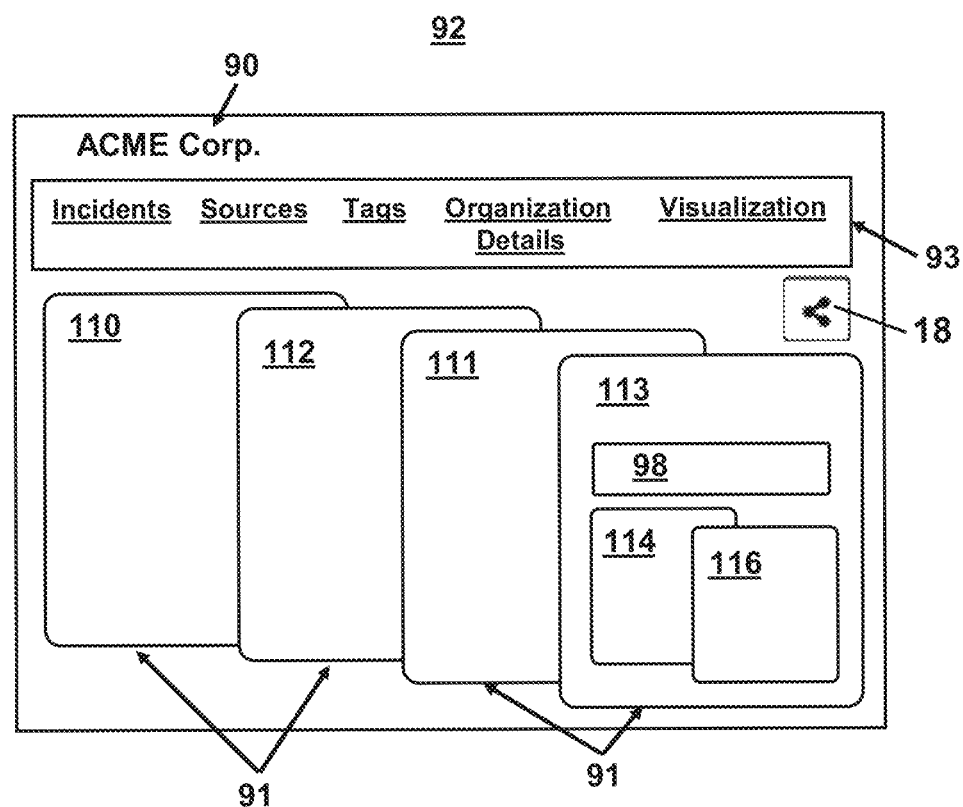
FIG. 18 is a diagram of an embodiment of group interface in an embodiment of the present invention.
Figure 29:
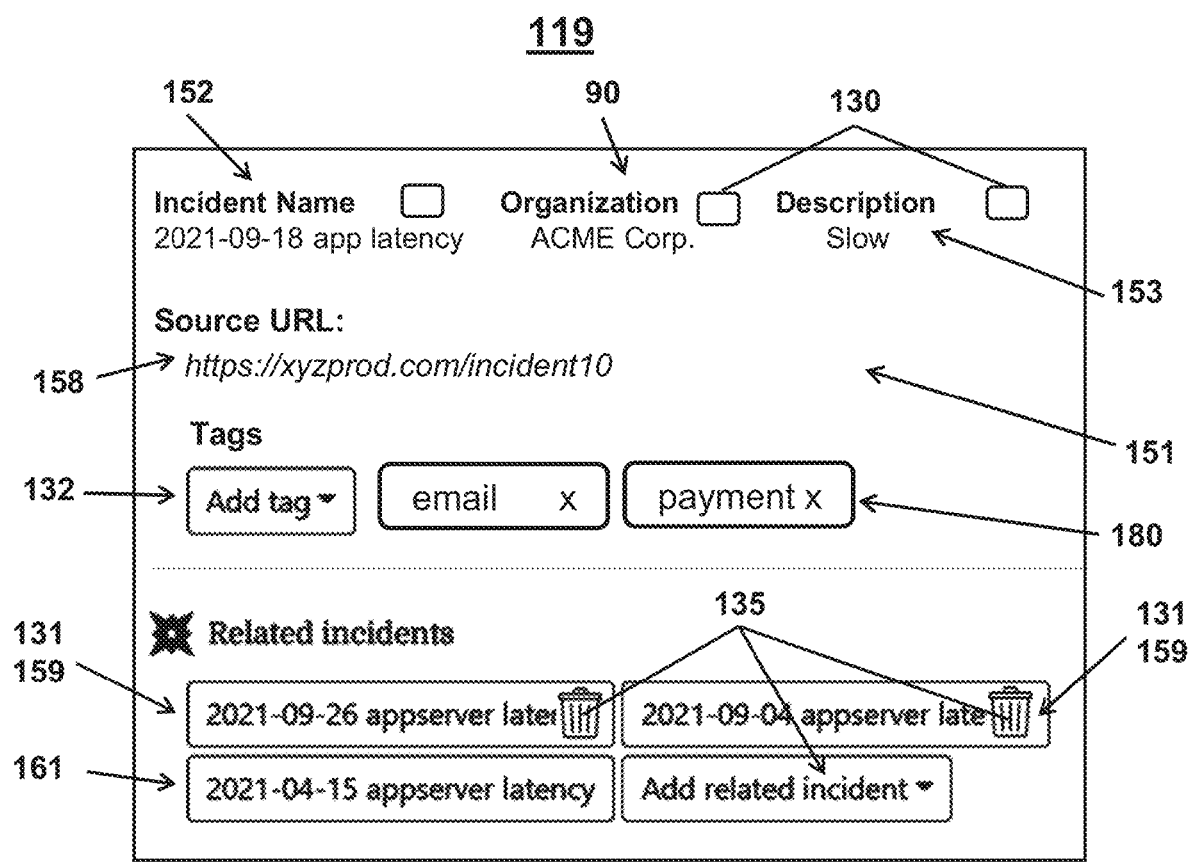
FIGS. 29, 30 are diagrams of an embodiment of an incident control panel in an embodiment of the present invention.

Embodiments of the invention may be used to explore and analyze one or more incidents to facilitate researchers performing incident analysis by facilitating the process of analyzing a group of incidents that share some commonality. Embodiments of the invention may comprise a grouped incident 150, which may be an analyzable incident belonging to a group 90 of analyzable incidents included in group 90 based on a commonality among the grouped incidents 150. For example, the grouped incidents 150 may be associated with a person, organization, business, other entities, or an association of any of the foregoing. In another example, group 90 may only include incidents 150 related to particular type of occurrences (e.g., internet service outages, data breaches, power grid failures, transportation accidents, electric vehicle malfunctions), related to particular equipment or machinery (e.g., specific make or model of a vehicle, networking or computing device, appliance, and others), or having other commonalities. For ease of reference, but without limiting the scope of the present disclosure, in the described embodiments group 90 represents an organization, for example "ACME corp." As illustrated in FIGS. 18, 29, and grouped incidents 150 are incidents occurring within, or affecting, that organization.

Grouped incident information 151 may comprise any information or data related to an incident, incident event 148, or incident event source 149, including, one or more of incident name 152, incident description 153 (e.g., any information relevant to an incident), incident time data 154, incident data source (e.g., link, URL) 158, cross-incident connections 159, 161, incident notes 163, and associated incident tags 165. Incident information 151 may also comprise incident resource links 164 to materials and other information that a user, such as analysis may find helpful while viewing an incident. Incident time data 154 may comprise one or more of incident start time 154*a* (e.g., the timestamp of the first incident event 148), incident end time 154*b*, incident duration 154*c*, incident create time 154*d* (e.g., the time of incident creation in database 1). Incident name 152 may be any information used to identify a grouped incident 150, and may comprise information suggesting date, time, location, type, category, abbreviations, and others about a grouped incident 150. Incident data source 158 preferably is a link to incident data in database 1. Incident data source 158 may be used to enable a user to access incident data of grouped incident 150 and may also be used to link one or more grouped incidents 150 through a cross-incident connection 159, 161.

Cross-incident connection 159, 161 comprise information indicating that grouped incidents 150 are connected, linked, or related. For example, a grouped incident 150 may have a cross-incident connection 159, 161 to another grouped incident 150. Information of a cross-incident connection may comprise an incident name 152*a* of another grouped incident 150*a*, or may comprise a link to an incident data source 158*a* of another grouped incident 150*a*. Cross-incident connection 159, 161 may be of several types. A preferred embodiment comprises a first type of incident connection 159, which will be referred to as an explicit incident connection 159, and a second type of incident connection 161, which will be referred to as an inferred incident connection 161.

The first type of incident connection, an explicit incident connection 161, may be a cross-incident connection (or link between incidents) that is part of incident data, or the data streams containing the information of events 32. Explicit incident connection 161 is part of the event data that is stored as part of grouped incident information 151. An explicit incident connection 161 may automatically be detected in an embodiment of the present invention, for example while importing the data into database 1, step 1001 of FIG. 1, or during steps 1103-1107 as shown in FIG. 4; or after the incident data is stored into database 1. GUI 4 may also be configured to detect explicit connections 161 in data 10 when the incident data is received from database 1. Explicit connections 161 may also be created by users who are authorized to do so, e.g., data managers or similar users with sufficiently high access credentials to data 10. In a preferred embodiment, explicit connections 161 may not be deleted or modified by a user of the preferred embodiment or of GUI 4, or may only be deleted or modified by a user authorized to do so based on user role within an organization and proper authentication.

An inferred incident connection 161 may be a cross-incident connection between related grouped incidents 150 created by a user, such as an analyst, while viewing or analyzing or annotating grouped incidents 150, for example by utilizing incident connection user control 135. An inferred incident connection 161 may be deleted, using incident connection user control 135. Preferably, only the user who created an inferred incident connection 161, and data managers are enabled to delete it.

A grouped incident 150 comprises one or more incident events 148. Incident events 148 are events 32 (or incident data representing events) associated with a grouped incident 150. Group 90 may comprise a plurality of group sources (or group actors) 170. The group sources comprise all incident event sources 149 associated with the grouped incidents 150 within group 90. In the example of a group 90 as an organization as a group 90, group sources 170 may be employees, contractors, vendors, customers, computers, monitoring devices, and any other human, software, or hardware entity, related to the group 90 organization that have produced event data. A grouped incident 150 may comprise one or more incident event sources 149 (or actors) that are associated with (e.g., produced, or are the source of) each incident event 148. Each incident event source 149 is selected from among the group sources 170 and each incident event source 149 may be an event source of one or more incident events 149. Each group source 170 may be an incident event source 149 in one or more grouped incidents 150.

Each group source 170 may be associated with source information 171, comprising one or more of source name 172, source incident information 173, 174, source description 175 (e.g., any relevant information about the source), and source tenure 176. Source incident information 173, 174 may comprise source incident count 173 information and source incident list 174 information. Source name 172 may be any type of identification for group source 170, such as name, id, randomly generated string or number, email address, user name, URI or URL, model or serial number, mac address, department location or designation, and any other information that can identify the group source 170, as well as combinations and abbreviations of the foregoing. Source incident list 174 comprises a list of grouped incidents 150 in which group source 170 is an event source (or actor) of an incident event. Source incident count 173 represents the count, or number, of incidents in source incident list 174. Source tenure 176 comprises information about the length of service of the source in association with group 90, for example length of employment by the group 90 organization for a human, or length of deployment for equipment. Source tenure 170 may be a start date 176*a*, a time duration or period (e.g., time since the start date, cumulative length of service periods), and other information representative of a source's tenure related to group 90.

In an embodiment illustrated in FIG. 18, GUI 4 may be configured to display a group interface 92, which may comprise a plurality of interactive graphical user interface panels 91, including one or more of a grouped incidents panel 110, a group tag panel 111, a group sources panel 112, group visualization panel 113, and a group details panel (not shown). The group visualization panel 113 may comprise a source visualization panel 114, and an incidents visualization panel 116. Group interface 92 may further comprise a navigation user control 93, enabling a user to switch between and interact with the grouped incidents panel 110, the group tag panel 111, the group sources panel 112, the group details panel, the group visualization panel 113, the source visualization panel 114, and the incidents visualization panel 116.

The group details panel (not shown) may be configured to display information related to group 90, including for example one or more of a group name, group description, group relevant times (e.g., creation time), explanation of the commonality between grouped incidents, rules for annotating incidents and events, statistical information, and other information that may be related to or descriptive of group 90. The group details panel may also comprise user controls configured to enable a user to modify or input information related to group 90 and to switch to other panels and/or display different views within GUI 4.

Figure 20:
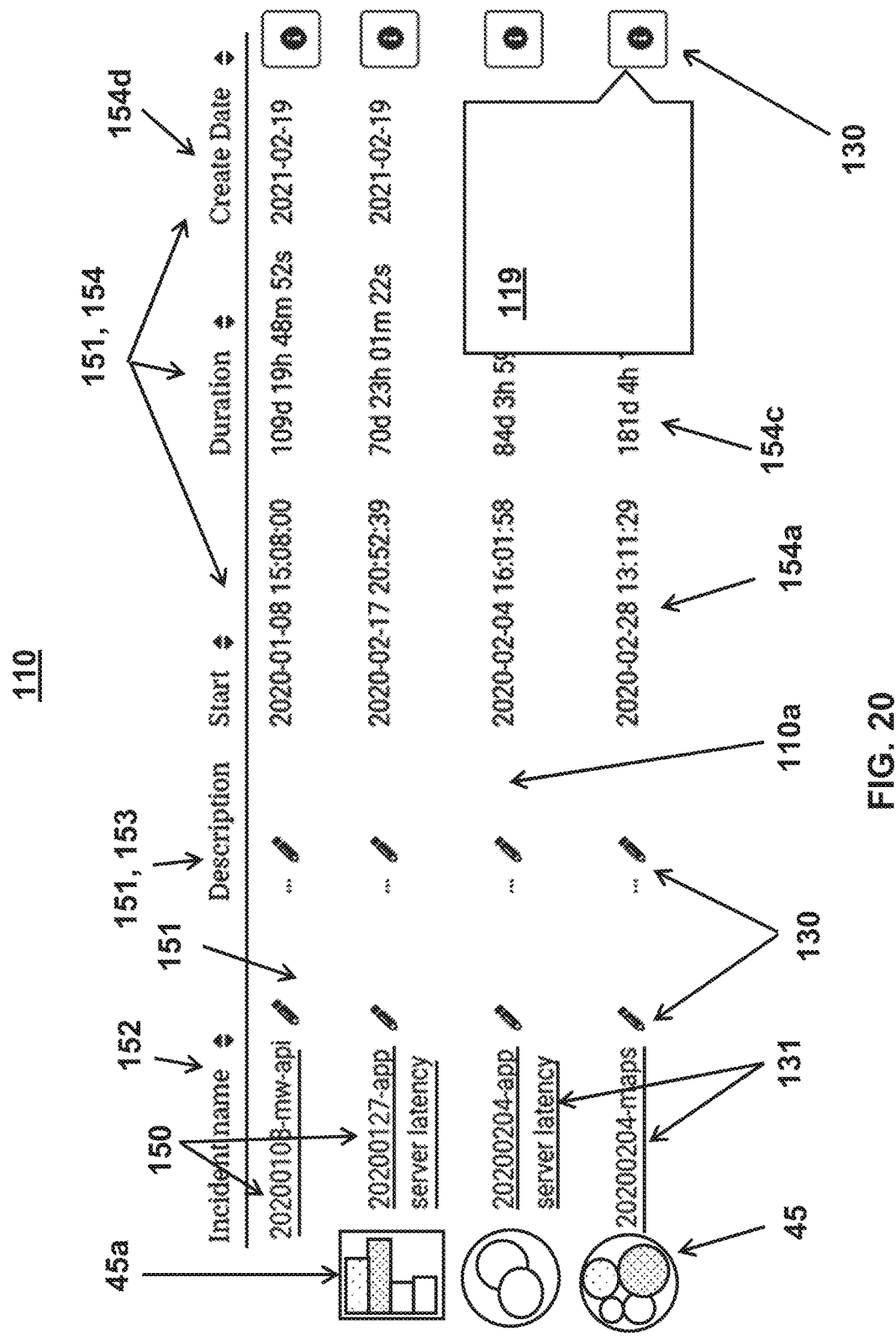
FIG. 20 is a diagram of an embodiment of a grouped incidents panel in an embodiment of the present invention.

An embodiment of the grouped incidents panel 110 illustrated in FIG. 20 displays an incidents list 110*a* comprising one or more incident source-event graphics 45 visually associated with each grouped incident 150. The incidents list 110*a* may also comprise incident information 151 for each grouped incident 150, and the one or more incident source event graphics 45 may be visually associated with the incident information 151 for each grouped incident 150. The incidents list 110*a* preferably comprises the one or more incident source-event graphics 45 visually associated with an incident name 152 and incident time data 154 for each grouped incident 150. The grouped incidents panel 110 may comprise an incident user control 130 configured to enable a user to utilize incident user control 130 to display and view incident information 151 and to annotate grouped incident 150. A user my annotate a group incident 150 by utilizing an incident user control 130 to modify incident information 151, by for example, changing the incident name 152, description 153, or group 90 association; creating a new group incident tag 180; associating or disassociating a grouped incident 150 with, or from, a group incident tag 180; providing, creating, or importing incident notes 163; creating or importing cross-incident connections 159, 161; and other actions. Incident user control 130 may be configured to enable a user to view incident information 151 and annotate grouped incident 150 from the incidents panel 110, or incident user control 130 may enable a user to display an incident control panel 119. Grouped incidents panel 110 may also comprise an incident navigation user control 131 (e.g., clickable URL or link, button) associated with a grouped incident 150 configured to enable a user to utilize the user control 131 to switch from the grouped incidents panel 110 to annotation panel 30 and view displayable events from grouped incident 150 in annotation panel 30.

Figure 19:
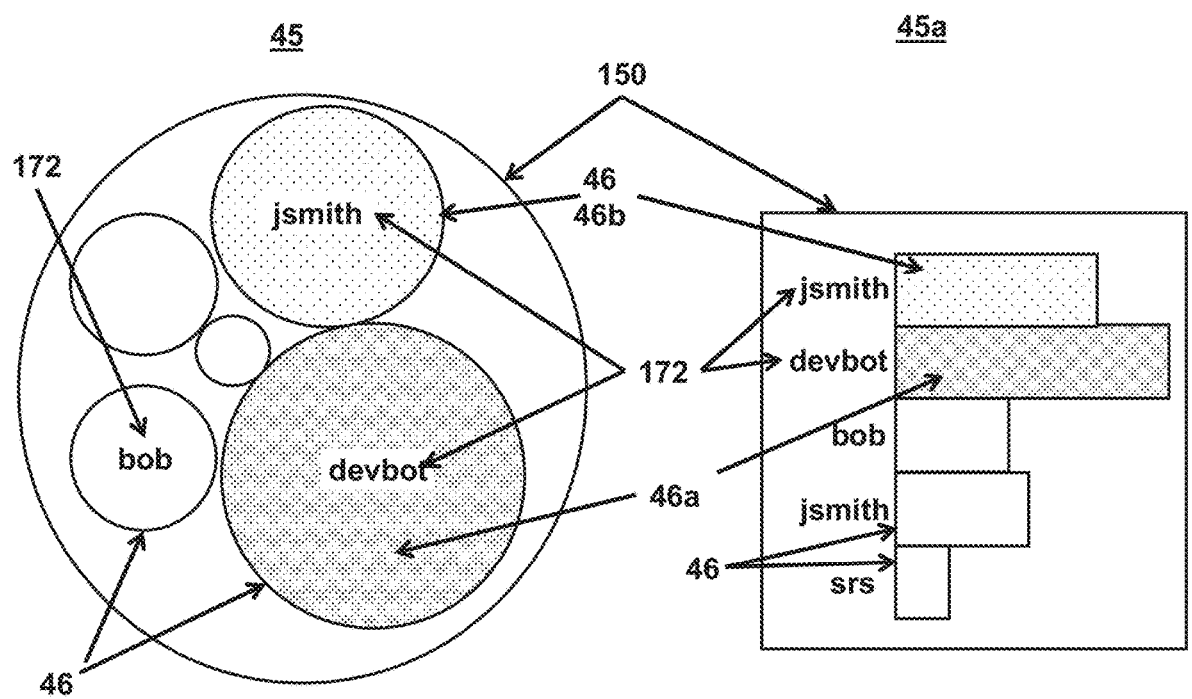
FIG. 19 is a diagram of embodiments of a graphic in an embodiment of the present invention.

Incident source-event graphic 45, illustrated for example in FIG. 19, visually represents event sources 35 from a grouped incident 150. Source-event graphic 45 may comprise a source-event icon 46 associated with an event source 35 from a grouped incident 150. The source-event icon 46 may have an icon visual characteristic (e.g., color, pattern, stippling) representative of source tenure 176, or other source information 171. For example, different colors may represent different ranges of source tenure 176, for example green may indicate very short tenure, while deep red may indicate the longest tenure. Similarly, as illustrated in FIG. 19, different density of stippling may represent different tenures, for example source-event icon 46*a* with 5% stippling (e.g., dotted) may represent one range of source tenure 176, while source-event icon 46*b* with 20% stippling may represent a different source tenure 176. Source-event icon 46 may also visualize the number of events each event source 35 produced within grouped incident 150 by for example displaying the source-event icon 46 with a size (e.g., diameter, diagonal, height, length) proportional to the number (e.g., count, quantity) of incident events that a grouped source 170 produced within a grouped incident 150. FIG. 19 illustrates examples of source-event graphic 45 in the form of a bubble chart 45 and a bar graph 45*a*.

Figure 30:
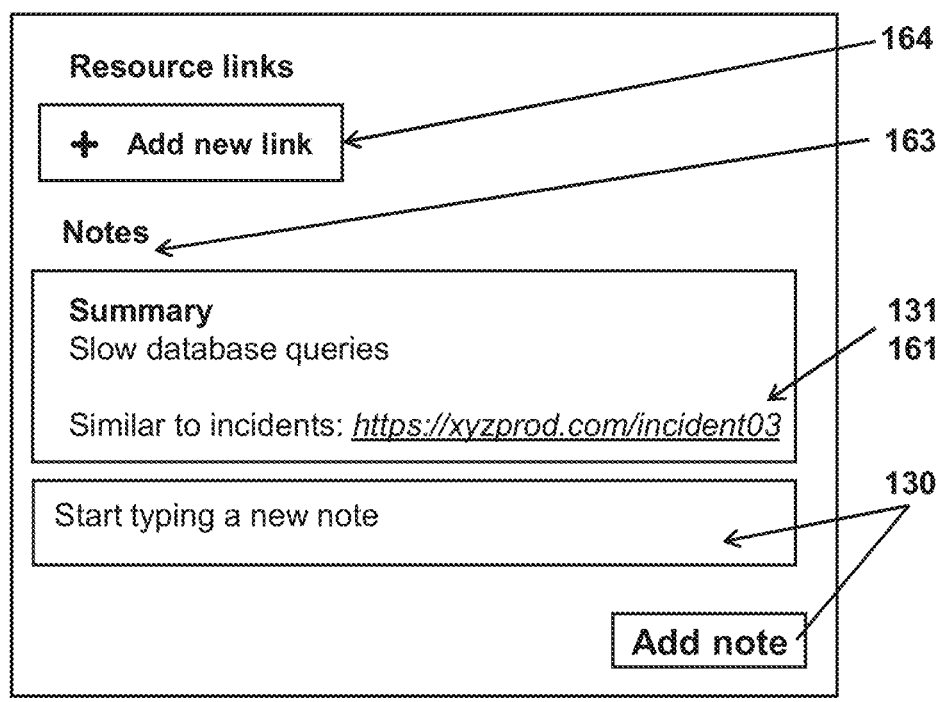

FIGS. 29, 30 illustrate an example of an incident control panel 119 displaying incident information 151. Incident control panel 119 may comprise an incident user control 130 enabling a user to view incident information 151 and to annotate grouped incident 150 from the incident control panel 119. Incident control panel 119 may comprise an incident navigation user control 131 associated with a grouped incident 150 linked through a cross-incident connection 159, 161 enabling a user to switch to annotation panel 30 and view displayable events from the grouped incident 150 linked through the cross-incident connection 159, 161.

Group interface 92 may also provide, for example, as part of incident control panel 119, or interface panels 91, an incident connection user control 135 associated with a grouped incident 150 configured to enable a user to create cross-incident connection 160, 162. In a preferred embodiment incident connection user control 135 may be utilized to create inferred incident connection 162 (e.g., the second type of cross-incident connection described above), but not an explicit incident connection 159 (e.g., the first type of cross-incident connection described above). Incident connection user control 135 may also be associated with a cross incident connection 159, 161 and configured to enable a user to delete or modify (e.g., changing the connected incidents) the cross-incident connection 159, 161. In a preferred embodiment, incident connection user control 135 may be utilized to delete or modify an inferred incident connection 161, and not an explicit incident connection 159. In this embodiment group interface 92, GUI 4, database 1, or another portion of the embodiment may be configured to prevent a user from deleting or modifying an explicit incident connection 159. In other embodiments, incident connection user control 135 may be configured to enable a user to create, modify, or delete all types of cross-incident connections depending on user authorization level, role in group 90 (e.g., level in an organization), and logon credentials.

Figure 21:
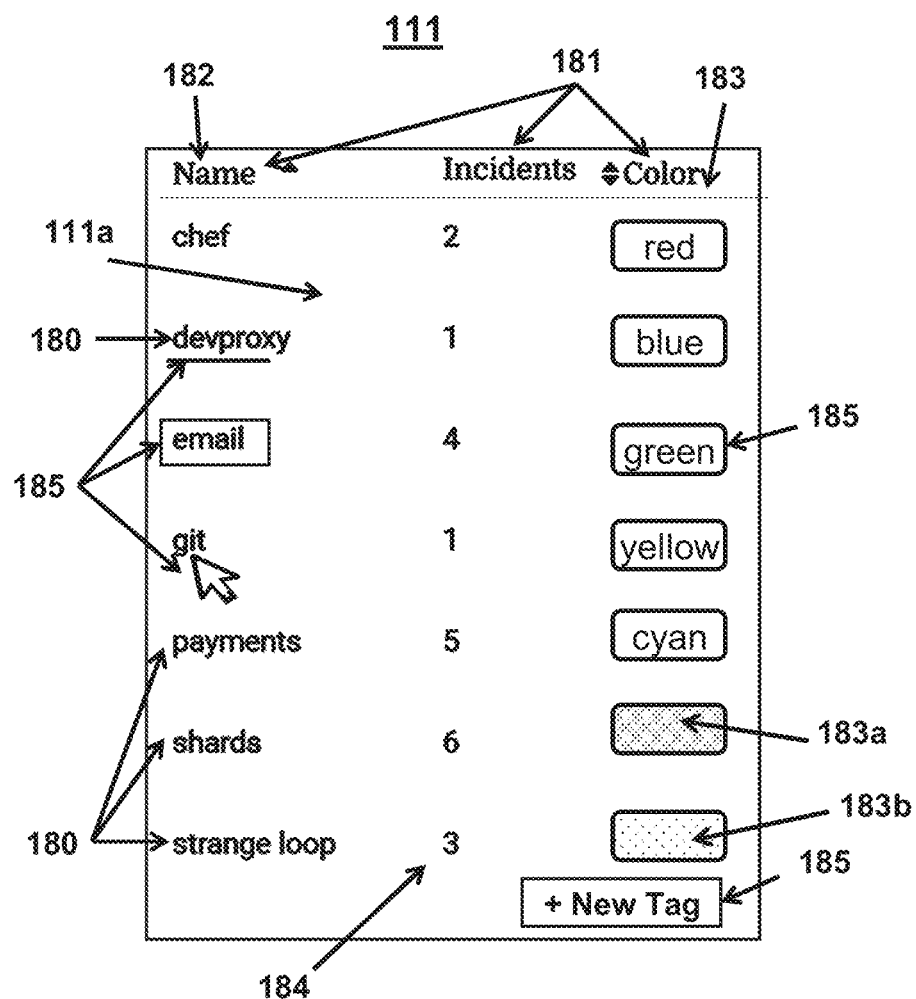
FIG. 21 is a diagram of an embodiment of a group tag panel in an embodiment of the present invention.
Figure 22:
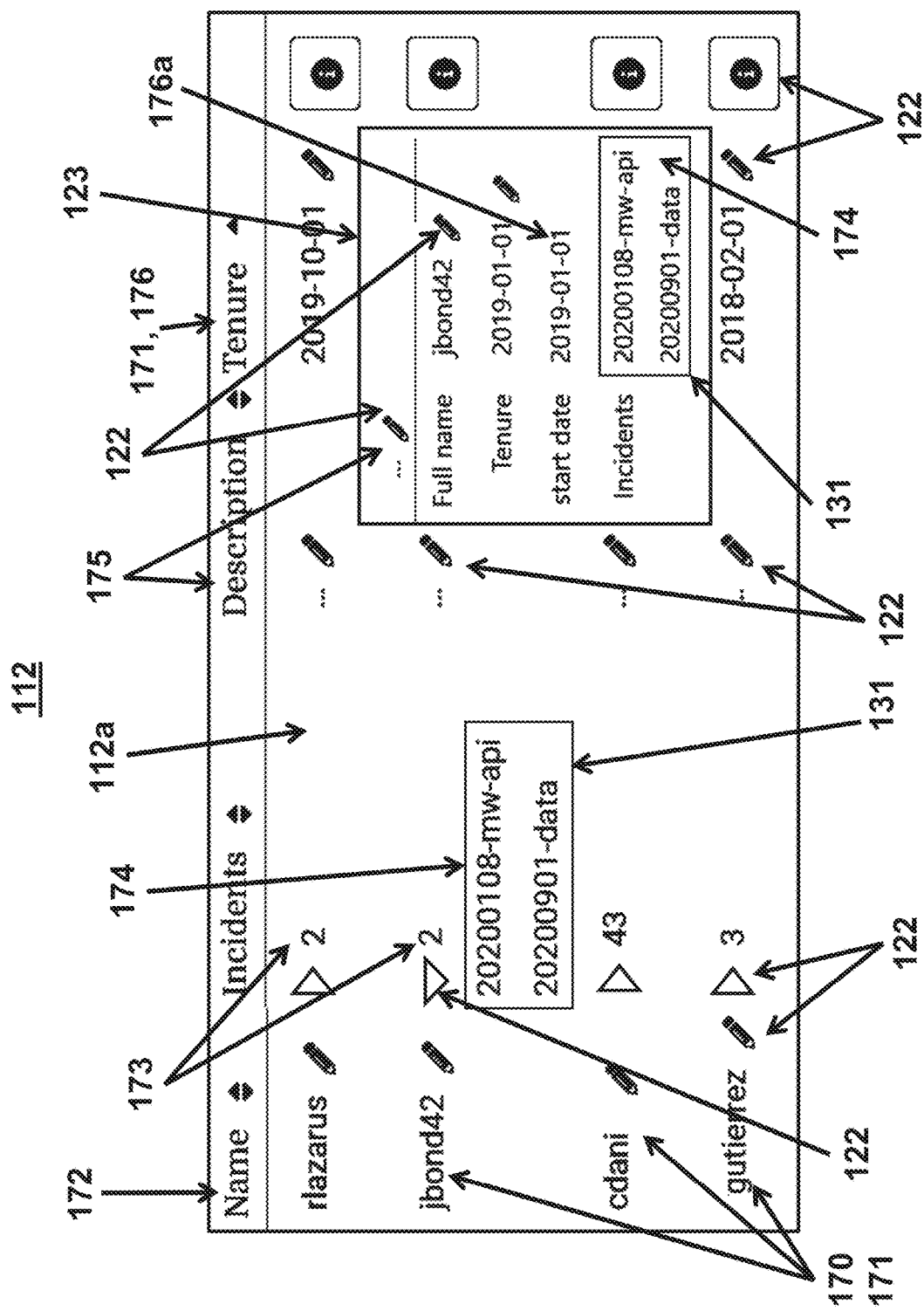
FIG. 22 is a diagram of an embodiment of a group sources panel in an embodiment of the present invention.

Group 90 may comprise one or more group incident tags 180 that a user may associate with a grouped incident 150 to annotate group incident 150. Group tag panel 111 displays a group tag list 111*a* comprising tag information 181 for each group incident tag 180. Tag information 181 may be an incident tag name 182, an incident tag visual characteristic 183 (e.g., color, shape, pattern, stippling, etc.), and tagged incidents information 184. Different tag visual characteristics are illustrated in FIG. 21, for example, different levels of stippling (dotting) shown as 183*a* (20% stippling) and 183*b* (5% stippling), and different colors, with the colors represented by their names. Incident tag name 182 can be used to provide a short description, label, or other information about a grouped incident 150 with which a group incident tag 180 is associated. For example, a tag name 182 "email" may indicate that an associated grouped incident 150 affected or involved email servers, a tag name 182 of "virus" may indicate a computer virus incident, or in infrastructure, an incident tag "generator" may indicate an incident involving power generator failure. Tagged incidents information 184 comprises information about how many (e.g., count, number) grouped incidents 150 are annotated with the group incident tag 180, and may also comprise information identifying each grouped incident 150 annotated (or associated) with the group incident tag 180. Group tag panel 111 may comprise a tag user control 185 enabling a user to create or delete existing group incident tags 180, and to modify tag information 181 as illustrated in FIG. 21 (e.g., showing a cursor/clickable link, color panel)

Embodiments of the invention may associate a user workspace with various user created incident information 151, for example incident tags 180, incident notes 163, user created cross-incident connections 159, 161, and incident resource links 164. Preferably, user-created incident information 151 will be associated with, or become part of, a user workspace that is also associated with the user who created the incident information.

Group sources panel (or group actors panel) 112 displays a group source list 112a comprising source information 171 for each group source 170. Sources panel 112 may further comprise a source user control 122 associated with each group source 170, and may be configured to enable a user to utilize the source user control 122 to switch between displaying either the source incidents list 174, or the source incidents count 173, or displaying both the source incidents list 174 and the source incidents count 173. Source user control 122 may also be configured to enable a user to modify source information 171 (e.g., source name, description, tenure, etc.) From the group sources panel 112, or to display a source control panel 123 allowing a user to modify source information 171 for group source 170. Group sources panel 112 may also comprise incident navigation user control 131 associated with a group incident 150 in source incidents list 174, wherein the incident navigation user control 131 is configured to enable a user to utilize the user control to switch from the group sources panel 112 to annotation panel 30 and view displayable events 32 from grouped incident 150 in annotation panel 30.

Group visualization panel 113 comprises a visualization user control 98 enabling a user to display the source visualization panel 114 and incidents visualization panel 116. Visualization user control 98 may also be configured to enable a user to utilize user control 98 to display the source visualization panel 114 in different views, for example, in a bubble chart view 114a or a bar graph view 114b. Visualization user control 98 may also be configured to enable a user to display the incidents visualization panel 116 in incident comparison view 116a, or in incident connection view 116b.

Source visualization panel 114 may display a group source graphic 115 visually representing each group source 170 within group 90. All group sources 170 may be visualized by graphic 115, or the information in the source visualization panel 114 may be filtered so that a source graphic 115 represents group sources 170 that meet certain criteria. Examples of such criteria may include displaying groups sources 170 who are event sources 35 of at least one event 32 in a grouped incident 150, displaying groups source 170 based on their source tenure 176, or if their source start date 176a is before, on, or after a date, and various other criteria.

Figure 23:
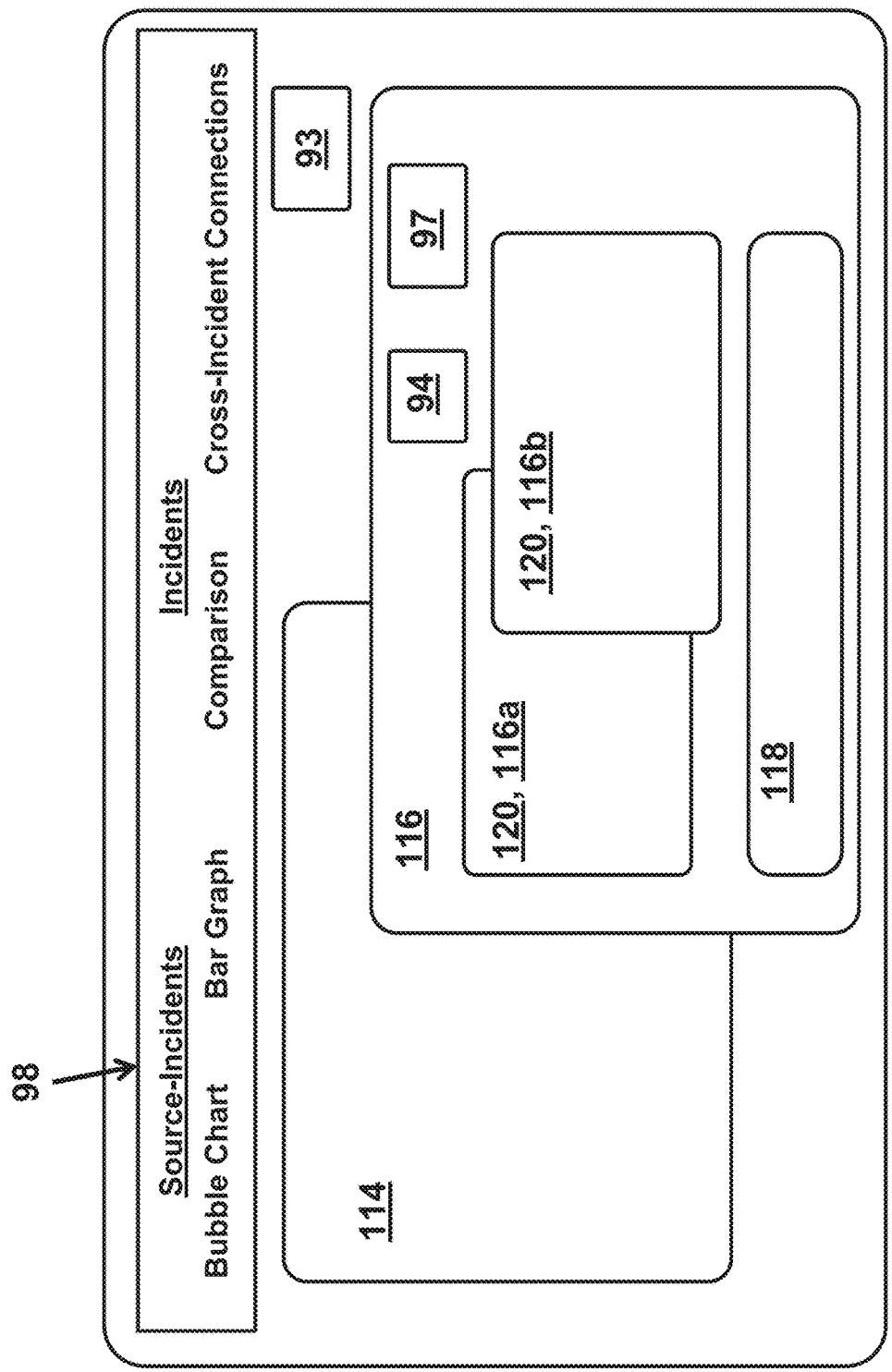
FIG. 23 is a diagram of an embodiment of visualization panels in an embodiment of the present invention.
Figure 24:
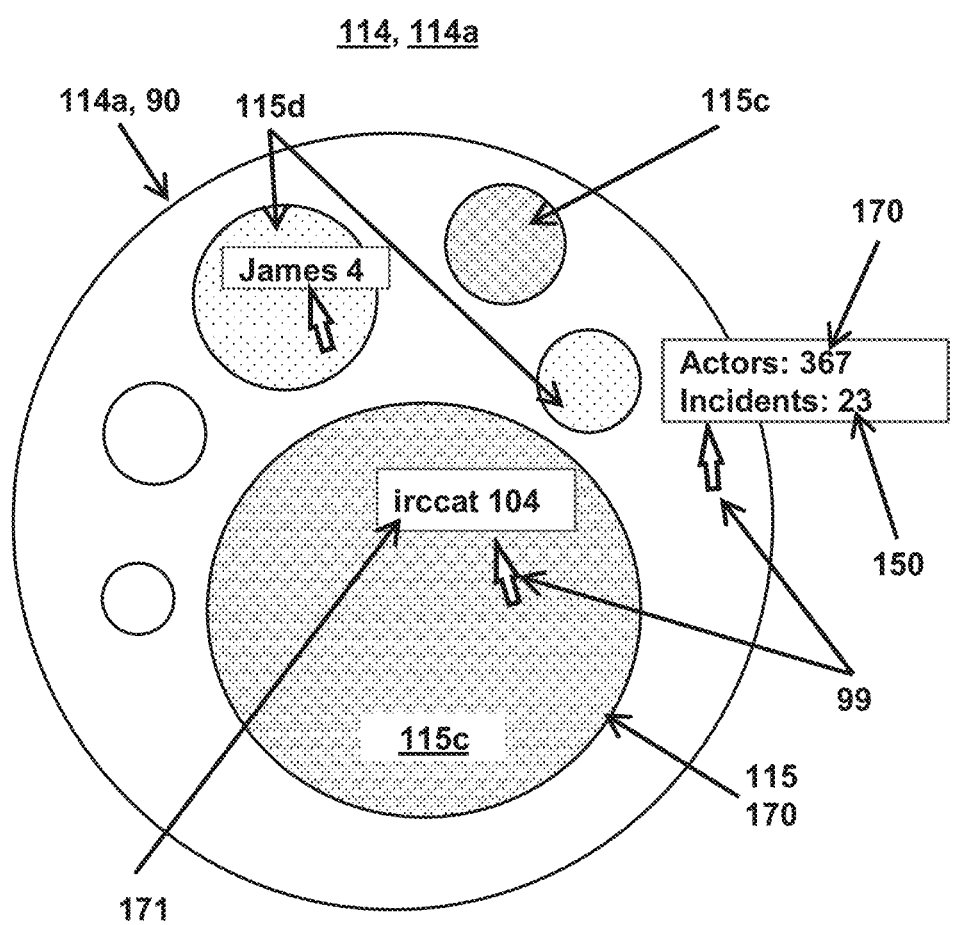
FIGS. 24, 25 are diagrams of embodiments of group graphics in an embodiment of the present invention.
Figure 25:
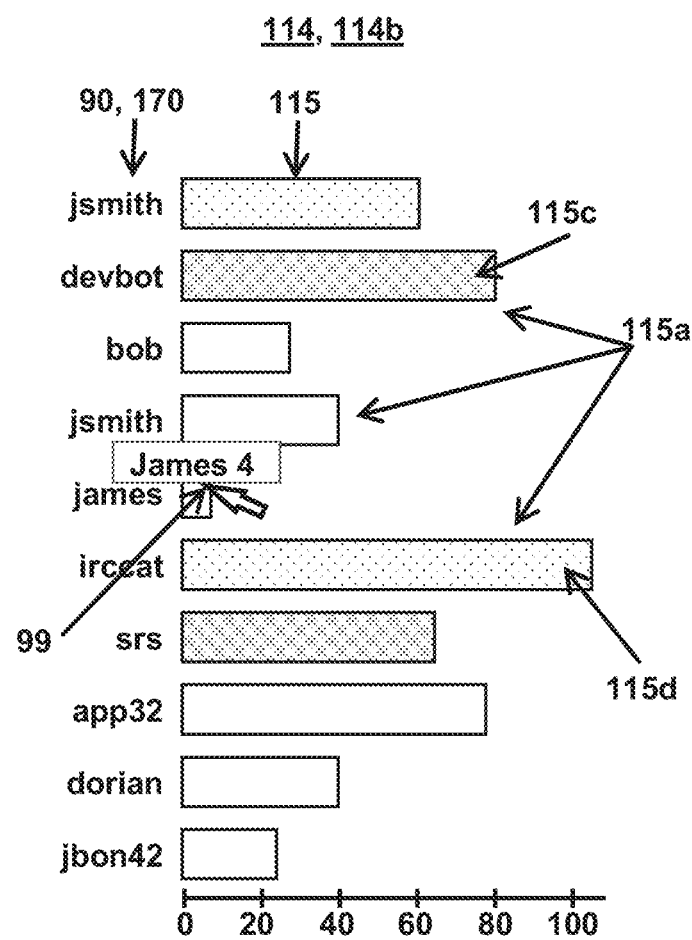
Figure 26:
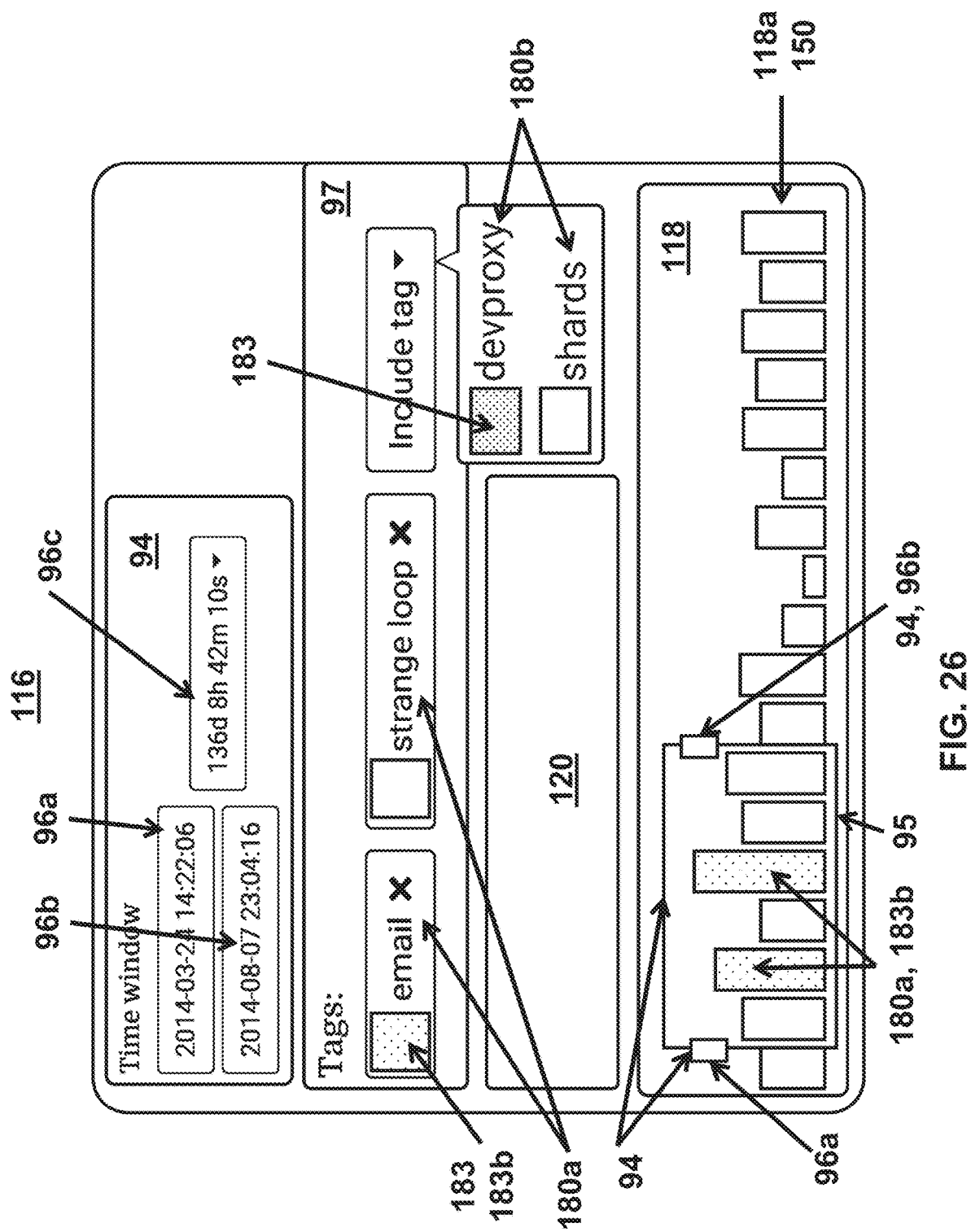
FIG. 26 is a diagram of an embodiment of a visualization panel in an embodiment of the present invention.

Source visualization panel 114 may also display a graphic visualizing information about group 90 (e.g., group sources, grouped incidents, incident events across all grouped incidents, etc.), for example as a geometric FIG. 114a (illustrated as a circle, or bubble) encompassing all displayed source graphics 115 as illustrated in FIG. 24, or as a cartesian axis 114b, along which source graphics 115 are arranged as illustrated in FIG. 23. In the example of FIG. 25, the x-axis represents a number of grouped incidents 150.

Source graphic 115 maybe a geometric shape such as a bubble (e.g., circle, disk) 115, a rectangle/bar 115a, another 2d or 3d geometric shape (e.g., triangle, sphere, cube, rectangle, and others), an image, or any other type of graphic. Source graphic 115 may have a source graphic visual characteristics (e.g., fill color, pattern, stippling, shape) indicative of a source tenure 176. For example, shades of a color, for example red, may represent ranges of source tenure 176, with the higher color intensity representing group sources 170 with the longer source tenure 176, and the lighter color intensity representing group sources 170 with shorter source tenure 176. In another example, illustrated in FIGS. 24, 25 (bubble chart, bar graph) source graphic 115c with 25% stippling may represent one range of source tenure 176, and source graphic 115d with 10% stippling may represent another range of source tenure 176. Source visualization panel 114 may also visualize the number (count, quantity) of grouped incidents 150 to which a group source 170 has produced events, by for example, displaying a source graphic 115 with a source graphic size (e.g., diameter, diagonal, height, length) proportional to the source incident count 173.

The source visualization panel 114 may comprise user control 98 configured to allow a user to view the source visualization panel 114 in different representations, for example a "bubble graph" 114a, a "bar graph" 114b, a column chart (not shown), stacked bar or column charts (not shown), and others. The source visualization panel 114 may comprise a source user control 99 associated with each source graphic 115 and configured to enable a user to view source information 171 about a grouped source 170. In the example in FIG. 3, group source 170 named "James" has been an incident event sources 149 contributing events in 4 grouped incidents 150, while "irccat" has contributed events to 104 grouped incidents 150. Source user control 99 may also be configured to enable a user to display and view information about group 90 as illustrated in FIG. 24, indicating that there are 367 grouped sources 170 and 23 grouped incidents 150 in group 90.

Incidents visualization panel 116 comprises an incidents area 120, an incident visualization user control 94, and a group timeline panel 118. Incidents area 120 displays an incident graphic 166, 167, visually representative of each grouped incident 150 during an incident display period 96. The incident graphic 166, 167 may have a visual indication of a visible incident tag 180a associated with the grouped incident 150. The group timeline panel 118 comprises a timeline of grouped incidents 150 in group 90 each grouped incident 150 represented by a timeline sequence graphic 118a. The group timeline panel 118 also comprises a display period graphic 95 highlighting a portion of the timeline corresponding to the incident display period 96. Incident graphic 166, 167 and timeline sequence graphic 118a may be configured to visually indicate that a grouped incident 150 is associated with a visible incident tag 180a, by displaying incident graphic 166, 167 and timeline sequence graphic 118a with a visual characteristic (e.g., color, shading, pattern, line weight or type) corresponding to a tag visual characteristic 183 of a visible incident tag 180a associated with the grouped incident 150.

Incident display user control 94, 97 may be configured as a display period user control 94 allowing a user to change the incident display period 96, by inputting or selecting a value for one or more of incident display period start time 96a, end time 96b, and duration 96c. Display period graphic 95 may be configured as a user adjustable display period graphic 95 and associated with the display period user control 94 enabling a user to adjust the incident display period 96 by clicking (or touching) and dragging the start time 96a (left border) or end time 96b (right border) of the graphic 95 to enlarge or reduce the incident display period, or a user may move the entire graphic 95 along the timeline sequence graphic 118a to select a different incident display period 96.

Incident display user control 94, 97 may also be configured as an incident tag display user control 97 enabling a user to select an incident tag to be a visible incident tag 180a or to be a hidden incident tag 180b.

Incidents visualization panel 116 may comprise incident user control 130 associated with a group incident 150 and incident graphic 166, 167 configured to enable a user to display, modify, and annotate incident information 151, for example by displaying a grouped incident control panel 119. Incidents visualization panel 116 may comprise an incident navigation user control 131 associated with a grouped incident 150 and incident graphic 166, 167, configured to enable a user to utilize the user control 131 to switch to annotation panel 30 and view displayable events from grouped incident 150 in annotation panel 30.

Figure 27:
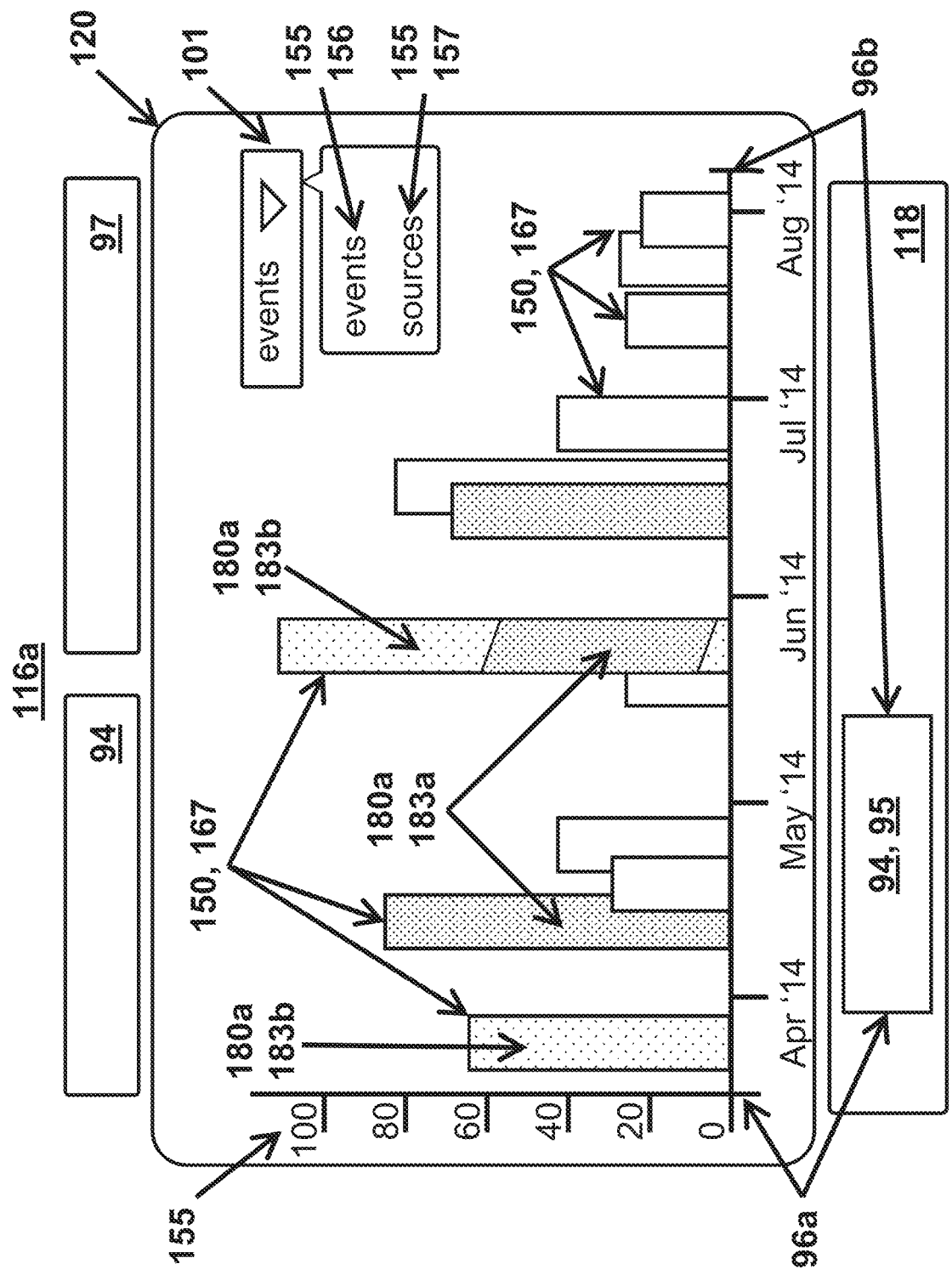
FIG. 27 is a diagram of an embodiment of an incident comparison visualization in an embodiment of the present invention.

In incident comparison view 116a incidents area 120 comprises a chronological sequence of an incident graphic 167 for each grouped incident 150 during the incident display period 96. Incident comparison view 116a allows visual comparison of grouped incidents 150 based on an incident quantitative characteristic 155 by displaying the incident graphic 167 with an incident graphic size proportionally representative of the incident quantitative characteristic 155. In the example of incidents area 120 in FIG. 27 grouped incidents 150 from a display time period 96 (from start time 96a through end time 96b) are represented by incident graphics 167 (shown as bars or columns) arranged in a chronological sequence according to incident start time 154a along the x-axis timeline, and the height of the incident graphics 167 corresponds to a quantitative characteristic 155 (e.g., number of incident events shown as "events") along the y-axis. Incident quantitative characteristic 155 may be any quantitative measure that a user may choose to characterize an incident. For example, an incident quantitative characteristic 155 may be a number of incident events 156, representative of how many incident events 148 are in a grouped incident 150 (indicated as "events" in FIG. 27); a number (or count) of incident event sources 157 (e.g., "sources" in FIG. 27), representative of how many incident event sources 149 are associated with (e.g., contributed or produced) incident events 148 in grouped incident 150; a number representative of how many cross-incident connections 159, 161 associated with a grouped incident 150; a number representative of the combined source tenure 176 of all incident event sources 149 in a grouped incident 150, and other determinable quantities or numbers associated with a grouped incident 150. Incident quantitative characteristic 155 may also comprise statistical information related to an incident, for example, mean, median, or deviation of sources' tenures, a sum of events from each source; a quantity representing the tenure of each source relative to the number (or count) of events from each source, and any other quantity determinable from information related to an incident. Incidents visualization panel 116 may also comprise an incident comparison user control 101 allowing a user to select an incident quantitative characteristic 155 and display grouped incidents 150 as graphics visually representative of the incident quantitative characteristic 155, thus enabling a visual comparison of grouped incidents 150.

In incident connection view 116b incidents area 120 comprises a sequence of incident icons 166 associated with each grouped incident 150 during the incident display period 96. Incidents area 120 may also comprise an incident connection graphic 160, 162, visually representing a cross-incident connection 159, 161, by visually connecting incident Icons 166 associated with connected grouped incidents 150.

Incident connection graphic 160 may be a first incident connection graphic 160 representative of a first type of, or explicit, cross-incident connection 159. Incident connection graphic 162 may be a second incident connection graphic 162 representative of a second type, or inherent, cross-incident connection 161. Incident connection graphic 160, 162, may be other types of incident connection graphics (not shown) representative of other types of cross-incident connections (not shown). Incident connection graphics 160, 162, are configured to visually indicate the type of cross-incident connection 159, 161 each graphic represents, so that the first incident connection graphic 160 and the second incident connection graphic 162 are visually differentiated. For example, a first incident connection graphic 160 may be displayed above the sequence of incident Icons 166 to represent a first, or explicit, cross-incident connection, while a second incident connection graphic 162 may be displayed below the sequence of incident Icons 166 to represent a second type, or an inherent, cross-incident connection. The different types of incident connection graphics 160, 162 may also be configured to have distinct visual characteristics (e.g., line color, weight, or style; curved or square connectors, labels, etc.) visually indicative of different types of cross-incident connections.

Figure 28:
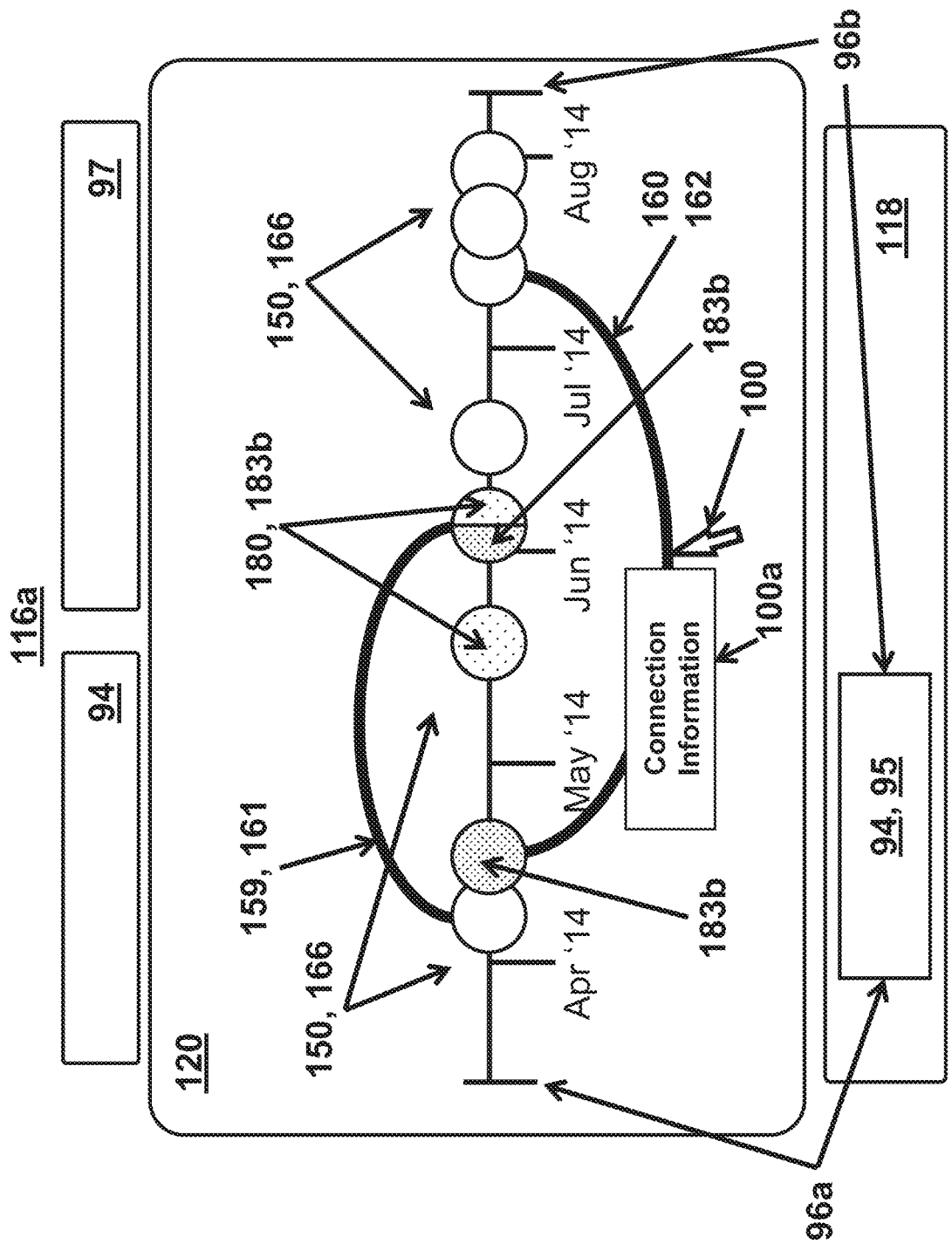
FIG. 28 is a diagram of an embodiment of cross-incident connections visualization in an embodiment of the present invention.

Group interface 92 may also provide, for example, as part of incidents visualization panel 116 or other interface panels 91, a connection user control 100 (e.g., click, shown as a cursor in FIG. 28) associated with an incident connection graphic 160, 162, configured to enable a user to display, view, modify, or annotate connection information 100a (e.g., shown as a pop-up "connection information" in FIG. 28) about a cross-incident connection 159, 161, or one or more of the grouped incidents 150 connected by the cross-incident connection 159, 161. Connection user control 100 may also comprise an incident navigation user control 131 configured to enable a user to utilize the incident navigation user control 131 to switch to the annotation panel 30 and view displayable events from a grouped incident 150 connected with a cross-incident connection 159, 161.

While the invention has been described with reference to exemplary embodiments, it will be understood by those skilled in the art that various changes, omissions, and/or additions may be made, and equivalents may be substituted, for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A system for analyzing a plurality of grouped incidents belonging to a group, the system comprising:
    a database storing the plurality of grouped incidents; and,
    a GUI configured to receive from the database the plurality of group incidents and to display the plurality of group incidents;
    wherein the GUI comprises a group interface;

wherein the group interface is configured to display one of a grouped incidents panel, a group visualization panel, or combinations thereof;

wherein the group comprises:
 the plurality of grouped incidents;
 a plurality of grouped sources; and,
 a group incident tag;

wherein each grouped source of the plurality of grouped sources is associated with source information;

wherein the source information is selected from the group consisting of a source name, a source incident information, a source tenure, and combinations thereof;

wherein the source incident information, is selected from one or more of a source incident count and a source incidents list;

wherein each grouped incident of the plurality of grouped incidents comprises incident information and an incident event;

wherein the incident event is associated with an incident event source;

wherein the incident event source is selected from the plurality of group sources;

wherein the grouped incidents panel displays an incident list comprising one or more incident source-event graphics associated with each of the plurality of grouped incidents;

wherein the incident source-event graphic comprises a source-event icon associated with the incident event source;

wherein the source-event icon has an icon characteristic visually representative of the source tenure of the incident event source;

wherein the size of the source-event icon is proportional to a quantity of the incident events associated with the incident event source;

wherein the grouped incidents panel comprises one or more incident user controls associated with each of the plurality of grouped incidents; and, wherein the incident user control is configured to enable a user to annotate each of the plurality of grouped incidents and to view the incident information.

2. The system of claim 1, wherein the group interface further comprises:
 a group sources panel; and,
 a group tag panel;
 wherein the group sources panel displays the source information;
 wherein the group sources panel comprises a source user control configured to enable the user to modify the source information;
 wherein the group tag panel displays tag information for the group incident tag;
 wherein the group tag panel comprises a tag user control configured to enable the user to modify the tag information;
 wherein the incident list comprises the incident information of each of the plurality of grouped incidents;
 wherein the incident information is selected from the group consisting of an incident name, an incident description, incident time data, cross-incident connections data, incident notes, associated incident tags, and combinations thereof;
 wherein the incident user control is configured to enable the user to utilize the incident user control to modify the incident name, to create a new group incident tag, to associate the new group incident tag with a grouped incident from the plurality of grouped incidents, to create incident notes, and combinations thereof;
 wherein the grouped incident tag comprises a tag characteristic;
 wherein the tag characteristic is selected from color, shading, pattern, line weight, line type, and combinations thereof; and,
 wherein the grouped incident tag is associated with the grouped incident.

3. The system of claim 2, wherein the GUI is configured to display an incident visualization panel;
 wherein the incident visualization panel comprises:
  an incidents area displaying an incident graphic visually representative of the incident information of each of the plurality of grouped incidents during an incident display period;
  an incident display period user control allowing the user to change the incident display period;
  an incident tag user control enabling the user to select the group incident tag to be a visible incident tag or to be a hidden incident tag; and,
  a group timeline panel comprising:
   a timeline sequence graphic representing a sequence of each of the plurality of grouped incidents; and,
   a display period graphic highlighting a portion of the timeline sequence graphic corresponding to the incident display period; and,
 wherein the incident graphic is visually representative of the tag characteristic.

4. The system of claim 3, wherein the group visualization panel further comprises a sources visualization panel;
 wherein the sources visualization panel comprises one or more group source graphics associated with each of the plurality of group sources;
 wherein the one or more group source graphics comprise a source graphic visual characteristic representative of the source tenure of each of the plurality of group sources; and,
 wherein the one or more group source graphics comprise a source graphic size proportional to the source incident count of each of the plurality of group sources.

5. The system of claim 3, wherein the grouped incident tag is a viewable incident tag;
 wherein the incident graphic comprises an incident visual characteristic indicative of a viewable incident tag associated with the incident;
 wherein the incident visual characteristic is selected from color, shading, pattern, line weight, line type, and combinations thereof;
 wherein the incident visualization panel is viewable in one of an incident comparison view and an incident connection view;
 wherein the group interface further comprises a navigation user control configured to enable the user to switch between the grouped incidents panel, the group visualization panel, and the incident visualization panel;
 wherein the navigation user control is configured to enable the user to view the incident visualization panel in one of the incident comparison view and the incident connection view;
 wherein the incidents area comprises a chronological sequence of the incident graphic for each grouped incident in the display period;
 wherein in the incident comparison view the incident graphic has an incident graphic size proportionally representative of an incident quantitative characteristic; and, wherein in the incident connection view, the incidents area comprises an incident connection graphic, visually indicating a cross-incident connection between the grouped incidents.

6. The system of claim 5, wherein the cross-incident connection is selected from a first type of cross-incident connection and a second type of cross-incident connection;
  wherein the incident connection graphic is selected from a first incident connection graphic and a second incident connection graphic;
  wherein the first incident connection graphic visually indicates the first type of cross-incident connection, and the second incident connection graphic visually indicates the second type of cross-incident connection; and,
  wherein the first incident connection graphic and the second incident connection graphic are visually differentiated.

7. The system of claim 6, wherein the first incident connection graphic and the second incident connection graphic are visually differentiated by displaying the first graphic above the chronological sequence and displaying the second graphic below the chronological sequence in the incidents area.

8. The system of claim 7, wherein the navigation user control is further configured to enable the user to switch between the tag panel, the group sources panel, and the source visualization panel.

9. The system of claim 6, wherein the group interface comprises an incident connection user control configured to enable the user to create or delete the second type of cross-incident connection; and,
  wherein the group interface is configured to prevent the user from deleting the first type of cross-incident connection.

* * * * *